United States Patent
Hikida et al.

(10) Patent No.: US 7,376,527 B2
(45) Date of Patent: May 20, 2008

(54) AZIMUTH MEASURING DEVICE

(75) Inventors: Koichi Hikida, Kanagawa (JP); Toru Kitamura, Chigasaki (JP); Masaya Yamashita, Machida (JP)

(73) Assignee: Asahi Kasei EMD Corporation, Tokyo (JP)

( * ) Notice: Subject to any disclaimer, the term of this patent is extended or adjusted under 35 U.S.C. 154(b) by 0 days.

(21) Appl. No.: 10/583,870

(22) PCT Filed: Dec. 17, 2004

(86) PCT No.: PCT/JP2004/018888

§ 371 (c)(1),
(2), (4) Date: May 15, 2007

(87) PCT Pub. No.: WO2005/061990

PCT Pub. Date: Jul. 7, 2005

(65) Prior Publication Data

US 2007/0276625 A1 Nov. 29, 2007

(30) Foreign Application Priority Data

Dec. 22, 2003 (JP) .............................. 2003-425734

(51) Int. Cl.
*G01C 17/38* (2006.01)
*G01P 21/00* (2006.01)
*G06F 15/00* (2006.01)

(52) U.S. Cl. .............................. 702/92; 702/94; 702/95
(58) Field of Classification Search .................. 702/92, 702/95, 150, 94
See application file for complete search history.

(56) References Cited

U.S. PATENT DOCUMENTS

| 1,422,942 | A | | 7/1922 | Eberly |
| 4,497,034 | A | | 1/1985 | Kuno et al. |
| 7,177,779 | B2 | * | 2/2007 | Hikida et al. ............... 702/150 |
| 2005/0256673 | A1 | | 11/2005 | Hikida et al. |
| 2005/0283988 | A1 | * | 12/2005 | Sato et al. .................... 33/356 |
| 2006/0021238 | A1 | * | 2/2006 | Sato et al. .................... 33/356 |
| 2006/0031014 | A1 | | 2/2006 | Sato et al. |
| 2006/0066295 | A1 | * | 3/2006 | Tamura et al. .............. 324/202 |
| 2006/0270903 | A1 | * | 11/2006 | Uchiyama et al. .......... 600/118 |

(Continued)

FOREIGN PATENT DOCUMENTS

JP 61-147104 7/1986

(Continued)

OTHER PUBLICATIONS

International Preliminary Report on Patentability in International Application No. PCT/JP2004/018888, dated Aug. 22, 2006, 6 pages.

(Continued)

*Primary Examiner*—John E. Barlow, Jr.
*Assistant Examiner*—Cindy D. Khuu
(74) *Attorney, Agent, or Firm*—Finnegan, Henderson, Farabow, Garrett & Dunner, LLP

(57) ABSTRACT

An azimuth measuring device is provided that can obtain offset information when the direction of the azimuth measuring device is arbitrarily changed. The offset information is calculated based on coordinates of a reference point obtained by a reference point estimating system. The azimuth measuring device can obtain the offset information without obtaining erroneous offset information when changing direction.

15 Claims, 16 Drawing Sheets

U.S. PATENT DOCUMENTS

2007/0033818 A1* 2/2007 Kitamura et al. ......... 33/355 R

FOREIGN PATENT DOCUMENTS

| JP | 62-255814 | 11/1987 |
|----|-----------|---------|
| JP | 64-046610 | 2/1989 |
| JP | 1-173614 | 12/1989 |
| JP | 03-048713 | 3/1991 |
| JP | 03-154821 | 7/1991 |
| JP | 08-105745 | 4/1996 |
| JP | 08-313261 | 11/1996 |
| JP | 10-132568 | 5/1998 |
| JP | 2000-131068 | 5/2000 |
| JP | 2003-035010 | 2/2003 |
| JP | 2003-042766 | 2/2003 |
| JP | 2003-065791 | 3/2003 |
| JP | 2004-309228 | 11/2004 |
| WO | WO 2004/003476 | 1/2004 |

OTHER PUBLICATIONS

International Search Report in International Application No. PCT/JP2004/018888, dated Mar. 29, 2006, 1 page.

Office Action in co-pending U.S. Appl. No. 10/563,128, filed Jun. 8, 2007 (Ex. Kundu).

Official Notice of Rejection of Korean Patent Office for corresponding Korean Patent Application No. 10-2006-7000029, dated Jun. 28, 2007.

* cited by examiner

AZIMUTH MEASURING DEVICE

TECHNICAL FIELD

The present invention relates to anazimuth measuring device of a magnetic sensing method.

BACKGROUND ART

Azimuth measuring devices which detect earth magnetism to obtain azimuths are used for navigation in cellular phones, or the like. When using an azimuth measuring device of this kind, it is usually known that it would indicate an erroneous azimuth unless an azimuth is obtained by subtracting the offsets which are an output signal caused by a surrounding magnetic field other than earth magnetism detected by a magnetic field sensor and an offset for an output of a signal processing circuit at the time when no signal is inputted.

As methods for obtaining an offset, there are known methods, as one disclosed in Patent Document 1, in which an azimuth measuring device is kept horizontally and turned around once, and the maximum and minimum of output signal are searched in the meantime and the offsets is set to a midpoint thereof, and another one in which, as disclosed in Patent Document 2, an equation for the trajectory of output signal while an azimuth measuring device is turned around once is solved based on geomagnetic data which is obtained by directing an azimuth measuring device at arbitrary three points being perpendicular to each other, and then an offset is calculated. In addition, there is a method in which offset information is calculated based on geomagnetic data obtained while the direction of an azimuth measuring device is arbitrarily changed in a three dimensional space (the above method can be found in Patent Document 3, and is incorporated into the present application with reference thereto).

FIG. 3 is a view explaining the concept of a method for obtaining offset information in an azimuth measuring device. This method is disclosed in Patent Document 3.

In FIG. 3, the direction of an azimuth measuring device 1 is arbitrarily changed in a three dimensional space, and, in the meantime, x-axis geomagnetic measured data, y-axis geomagnetic measured data, and z-axis geomagnetic measured data are repeatedly obtained until the number of obtained data reaches a predetermined number N. Hereinafter, Sx, Sy, and Sz denote geomagnetic measured data on which sensitivity correction has been performed with a sensitivity correction calculation section provided to an azimuth measuring device 1, unless otherwise noted.

Individual data of Sx, Sy, and Sz having been repeatedly obtained are respectively set as P1(S1x, S1y, S1z), P2(S2x, S2y, S2z), P3(S3x, S3y, S3z), ..., and as shown in FIG. 3. They are placed in a three dimensional space by relating the values of Sx, Sy, and Sz to the direction components of the respective axes.

Here, Sx, Sy, and Sz are expressed by the following equations.

$$Sx = a \cdot Mx + Cx \quad (1)$$

$$Sy = a \cdot My + Cy \quad (2)$$

$$Sz = a \cdot Mz + Cz \quad (3)$$

where a is a sensitivity after performing a sensitivity correction for an x-axis hall element HEx, a y-axis hall element HEy, and a z-axis hall element HEz; Mx, My, and Mz are x, y, and z-axis direction components of earth magnetism; and Cx, Cy, and Cz are the offsets of Sx, Sy, and Sz, respectively.

On the other hand, the relationship between Mx, My, Mz and M is given as follows.

[Equation 1]

$$M = \sqrt{M_x^2 + M_y^2 + M_z^2} \quad (4)$$

Now, setting as,

[Equation 2]

$$r = a\sqrt{M_y^2 + M_y^2 + M_z^2} \quad (5)$$

then, the following equation is derived.

$$(Sx - Cx)^2 + (Sx - Cx)^2 + (Sx - Cx)^2 = r^2 \quad (6)$$

That is, (Sx, Sy, Sz) is certainly placed away from a reference point OP(Cx, Cy, Cz) with the same distance r.

Accordingly, the reference point OP can be estimated by calculating a point which has equal distances from all the points of P1(S1x, S1y, S1z), P2(S2x, S2y, S2z), P3(S3x, S3y, S3z), ..., and the offsets Cx, Cy, and Cz can be obtained on the basis of the coordinate values thereof.

Although there are various kinds of methods for estimating the reference point OP, Sx, Sy, and Sz to be actually obtained are measured data of extremely weak earth magnetism which is of the order of 0.01 mT, and overlap with a significant amount of noise, and it is hence preferred that a statistical method be used after increasing the number of obtained data N as many as possible. Now, for example, according to a method described in Patent Document 3, as in the following equation, a system of linear equations with respect to Cx, Cy, and Cz can be solved, and thereby the reference point OP can be estimated in a good accuracy while suppressing the increase of the calculation time.

[Equation 3]

$$\begin{bmatrix} \sum Si_x(Si_x - \overline{S_x}) & \sum Si_y(Si_x - \overline{S_x}) & \sum Si_z(Si_x - \overline{S_x}) \\ \sum Si_x(Si_y - \overline{S_y}) & \sum Si_y(Si_y - \overline{S_y}) & \sum Si_z(Si_y - \overline{S_y}) \\ \sum Si_x(Si_z - \overline{S_z}) & \sum Si_y(Si_z - \overline{S_z}) & \sum Si_z(Si_z - \overline{S_z}) \end{bmatrix} \begin{bmatrix} C_x \\ C_y \\ C_z \end{bmatrix} = \quad (7)$$

$$\frac{1}{2} \begin{bmatrix} \sum (Si_x^2 + Si_y^2 + Si_z^2)(Si_x - \overline{S_x}) \\ \sum (Si_x^2 + Si_y^2 + Si_z^2)(Si_y - \overline{S_y}) \\ \sum (Si_x^2 + Si_y^2 + Si_z^2)(Si_z - \overline{S_z}) \end{bmatrix}$$

where

[Equation 4]

$$\overline{S_x} = \frac{1}{N} \sum Si_x \quad (8)$$

[Equation 5]

$$\overline{S_y} = \frac{1}{N} \sum Si_y \quad (9)$$

[Equation 6]

$$\overline{S_z} = \frac{1}{N}\sum Si_z \qquad (10)$$

Moreover, r is expressed by following equation by using Cx, Cy and Cz.

[Equation 7]

$$r^2 = \frac{1}{N}\sum \{(Si_x - C_x)^2 + (Si_y - C_y)^2 + (Si_z - C_z)^2\} \qquad (11)$$

FIG. 4 is a flowchart showing a method of obtaining offset information in an azimuth measuring device. This method is disclosed in Patent Document 3.

In FIG. 4, a data buffer section provided to an azimuth measuring device obtains geomagnetic measured data Sx, Sy, and Sz, and puts them into a buffer. (Step S1)

Next, it is determined whether the number of geomagnetic measured data Sx, Sy, and Sz retained in the data buffer section has reached the predetermined number N of data to be obtained. (Step S2)

When the number of geomagnetic measured data Sx, Sy, and Sz retained in the data buffer section has not reached the predetermined number N of data to be obtained, the process returns to Step S1.

On the other hand, when the number of geomagnetic measured data Sx, Sy, and Sz retained in the data buffer section has reached the predetermined number N of data to be obtained, a data processing section provided to an azimuth measuring device 1 reads geomagnetic measured data Sx, Sy, and Sz from the data buffer section to the number of which data correspond to the predetermined number N of data to be obtained; and the coordinates Cx, Cy, and Cz of the reference point OP are estimated such that the variation of the distances from individual data P1(S1x, S1y, S1z), P2(S2x, S2y, S2z), P3(S3x, S3y, S3z), . . . is minimized. (Step S3)

As the offsets of geomagnetic measured data Sx, Sy, and Sz, the coordinates Cx, Cy, and Cz of the reference point OP are stored in an offset information storing section provided to an azimuth measuring device. (Step S4)

Patent Document 1: U.S. Pat. No. 1,422,942 Specification
Patent Document 2: Japanese Patent Application Laid-open No. 2000-131068
Patent Document 3: International Application No. JP03/08293 Specification

DISCLOSURE OF THE INVENTION

However, in the method of obtaining offset information disclosed Patent Document 3, when the direction of an azimuth measuring device is changed while retaining its attitude with respect to a specific direction W without being arbitrarily changed in the period of obtaining data, individual data P1(S1x, S1y, S1z), P2(S2x, S2y, S2z), P3(S3x, S3y, S3z), . . . are distributed on a circle C formed by an intersection of a sphere S with the reference point OP as the center and the distance r as the radius, and a specific plane P. Accordingly, there is the disadvantage that Eq. (7) becomes unsolvable or is erroneously solved giving a large calculation error.

An object of the present invention is to provide an azimuth measuring device which solves the above described problem.

To achieve the above described object, a feature of an invention of a first embodiment of the present invention is that the first embodiment includes triaxial earth magnetism detecting means for detecting earth magnetism; output data obtaining means for repeatedly obtaining triaxial output data not smaller than a predetermined number of times, the triaxial output data being obtained from the earth magnetism detecting means at a time when the direction of the earth magnetism detecting means changes in a three dimensional space; reference point estimating means for estimating, using a statistical method, coordinates of a position where variation of distances from a group of triaxial output data obtained by the output data obtaining means is minimum in a three dimensional space in which the triaxial output data are placed by relating the values of the triaxial output data to the direction components of the respective axes, and for setting the coordinates which are estimated to as a reference point; offset information calculating means for calculating offset information of output data from the earth magnetism detecting means based on coordinates of the reference point obtained by the reference point estimating means; and plane determining means for determining whether a group of output data obtained by the output data obtaining means are distributed in the vicinity of a specific plane, wherein when it is determined by the plane determining means that the group of output data are distributed in the vicinity of the specific plane, the coordinates of the reference point are not estimated by the reference point estimating means, or the coordinates of the reference point estimated by the reference point estimating means are deleted.

A feature of an invention of a second embodiment of the present invention is that, in the first embodiment, the plane determining means makes the determination based on whether a matrix consisted of coefficients of a system of linear equations with the reference points being unknowns is singular or nearly singular.

A feature of an invention of a third embodiment of the present invention is that, in the first embodiment, the plane determining means estimates the specific plane using a group of output data obtained by the output data obtaining means, calculates a correlation between the group of output data and the specific plane, and makes the determination based on whether the correlation is greater than a predetermined value.

A feature of an invention of a forth embodiment of the present invention is that, in the first embodiment, the plane determining means makes the determination based on whether a summation of distances is greater than a predetermined value, one of the distances being a distance to the specific plane from a point that is a farthermost point from the specific plane among the group of output data in one of two domains separated by the specific plane, and the other one of the distances being a distance to the specific plane from a point that is a farthermost point from the specific plane among the group of output data in the other one of the two domains.

A feature of an invention of a fifth embodiment of the present invention is that, in any one of the first to forth embodiments, a warning notice displaying means is further included which displays a warning notice when the plane determining means determines that the group of output data distributes in the vicinity of the specific plane.

A feature of an invention of a sixth embodiment of the present invention is that the sixth embodiment includes triaxial earth magnetism detecting means for detecting earth magnetism; output data obtaining means for repeatedly obtaining triaxial output data not smaller than a predetermined number of times, the triaxial output data being obtained from the earth magnetism detecting means at a time when the direction of the earth magnetism detecting means changes in a three dimensional space; reference point estimating means for estimating, using a statistical method, coordinates of a position where variation of distances from a group of triaxial output data obtained by the output data obtaining means is minimum in a three dimensional space in which the triaxial output data are placed by relating the values of the triaxial output data to the direction components of the respective axes, and for setting the coordinates which are estimated to as a reference point; offset information calculating means for calculating offset information of output data from the earth magnetism detecting means based on coordinates of the reference point obtained by the reference point estimating means; plane determining means for determining whether a group of triaxial output data obtained by the output data obtaining means are distributed in the vicinity of a specific plane; plane estimating means for estimating the specific plane using a group of output data obtained by the output data obtaining means, and for setting the specific plane which is estimated as a reference plane; temporary reference point estimating means for estimating, using a statistical method, coordinates of a position where variation of distances is minimum on the reference plane obtained by the plane estimating means, the distances being those from a group of projected points where a group of triaxial output data obtained by the output data obtaining means are projected on the reference plane, and for setting the coordinates which is estimated as a temporary reference point; and reference point correcting means for correcting a temporary reference point obtained by the temporary reference point estimating means, and for setting the temporary reference point which is corrected as a reference point, wherein when it is determined by the plane determining means that the group of output data are distributed in the vicinity of the specific plane, the reference plane is estimated by the plane determining means; a temporary reference point is estimated by the temporary reference point estimating means; a reference point is calculated by the reference point correcting means; and the offset information calculating means calculates offset information of output data of the earth magnetism detecting means based on coordinates of a reference point calculated by the reference point correcting means.

A feature of an invention of a seventh embodiment of the present invention is that in the sixth embodiment, the plane determining means makes the determination based on whether a matrix consisted of coefficients of a system of linear equations with the reference points being unknowns is singular or nearly singular.

A feature of an invention of an eighth embodiment of the present invention is that in the sixth embodiment, the plane determining means estimates the specific plane using a group of output data obtained by the output data obtaining means, calculates a correlation between the group of output data and the specific plane, and makes the determination based on whether the correlation is greater than a predetermined value.

A feature of an invention of a ninth embodiment of the present invention is that in the sixth embodiment, the plane determining means makes the determination based on whether a summation of distances is greater than a predetermined value, one of the distances being a distance to the specific plane from a point that is a farthermost point from the specific plane among the group of output data in one of two domains separated by the specific plane, and the other one of the distances being a distance to the specific plane from a point that is a farthermost point from the specific plane among the group of output data in the other one of the two domains.

A feature of an invention of a tenth embodiment of the present invention is that in any one of the sixth to the ninth embodiments, a warning notice displaying means is further included which displays a warning notice when the plane determining means determines that the group of output data distributes in the vicinity of the specific plane.

A feature of an invention of an eleventh embodiment of the present invention is that in any one of the sixth to the ninth embodiments, the reference point correcting means sets a closest point to a reference point previously estimated as the reference point on a straight line which passes through the temporary reference point, and which is perpendicular to the reference plane.

A feature of an invention of a twelfth embodiment of the present invention is that in any one of the sixth to the ninth embodiments, the reference point correcting means estimates a representative value of distances from the group of projected points to the temporary reference point using a statistical method, and sets, as the reference point, a point whose distance from a circle on the reference plane is equal to a predetermined value, the circle having the temporary reference point as the center and the representative value of the distances as the radius.

A feature of an invention of a thirteenth embodiment of the present invention is that the thirteenth embodiment includes triaxial earth magnetism detecting means for detecting earth magnetism; output data obtaining means for repeatedly obtaining triaxial output data not smaller than a predetermined number of times, the triaxial output data being obtained from the earth magnetism detecting means at a time when the direction of the earth magnetism detecting means changes in a three dimensional space; plane estimating means for estimating a plane of which a group of triaxial output data obtained by the output data obtaining means locate in the vicinity, in a three dimensional space in which the triaxial output data are placed by relating the values of the triaxial output data to the direction components of the respective axes, and for setting the plane which is estimated as a reference plane; temporary reference point estimating means for estimating, using a statistical method, coordinates of a position where variation of distances is minimum on the reference plane obtained by the plane estimating means, the distances being those from a group of projected points where a group of triaxial output data obtained by the output data obtaining means are projected on the reference plane, and for setting the coordinates which is estimated as a temporary reference point; reference point correcting means for correcting a temporary reference point obtained by the temporary reference point estimating means, and for setting the temporary reference point which is corrected as a reference point; and offset information calculating means for calculating offset information of output data from the earth magnetism detecting means based on coordinates of the reference point obtained by the reference point correcting means.

A feature of an invention of a fourteenth embodiment of the present invention is that in the thirteenth embodiment, the reference point correcting means sets a closest point to a reference point previously estimated as the reference point on a straight line which passes through the temporary reference point, and which is perpendicular to the reference plane.

A feature of an invention of a fifteenth embodiment of the present invention is that in the thirteenth embodiment, the reference point correcting means estimates a representative value of distances from the group of projected points to the temporary reference point using a statistical method, and sets, as the reference point, a point whose distance from a circle on the reference plane is equal to a predetermined value, the circle having the temporary reference point as the center and the representative value of the distances as the radius.

According to the present invention, it becomes possible to prevent the occurrence of the problem that erroneous offset information is obtained when the direction of the azimuth measuring device is changed while retaining its attitude with respect to a specific direction without being arbitrarily changed in the period of obtaining data. Further, offset information corresponding to one in the case where the direction of the azimuth measuring device change arbitrarily can be obtained.

BEST MODE FOR CARRYINT OUT THE INVENTION

Figure 1:
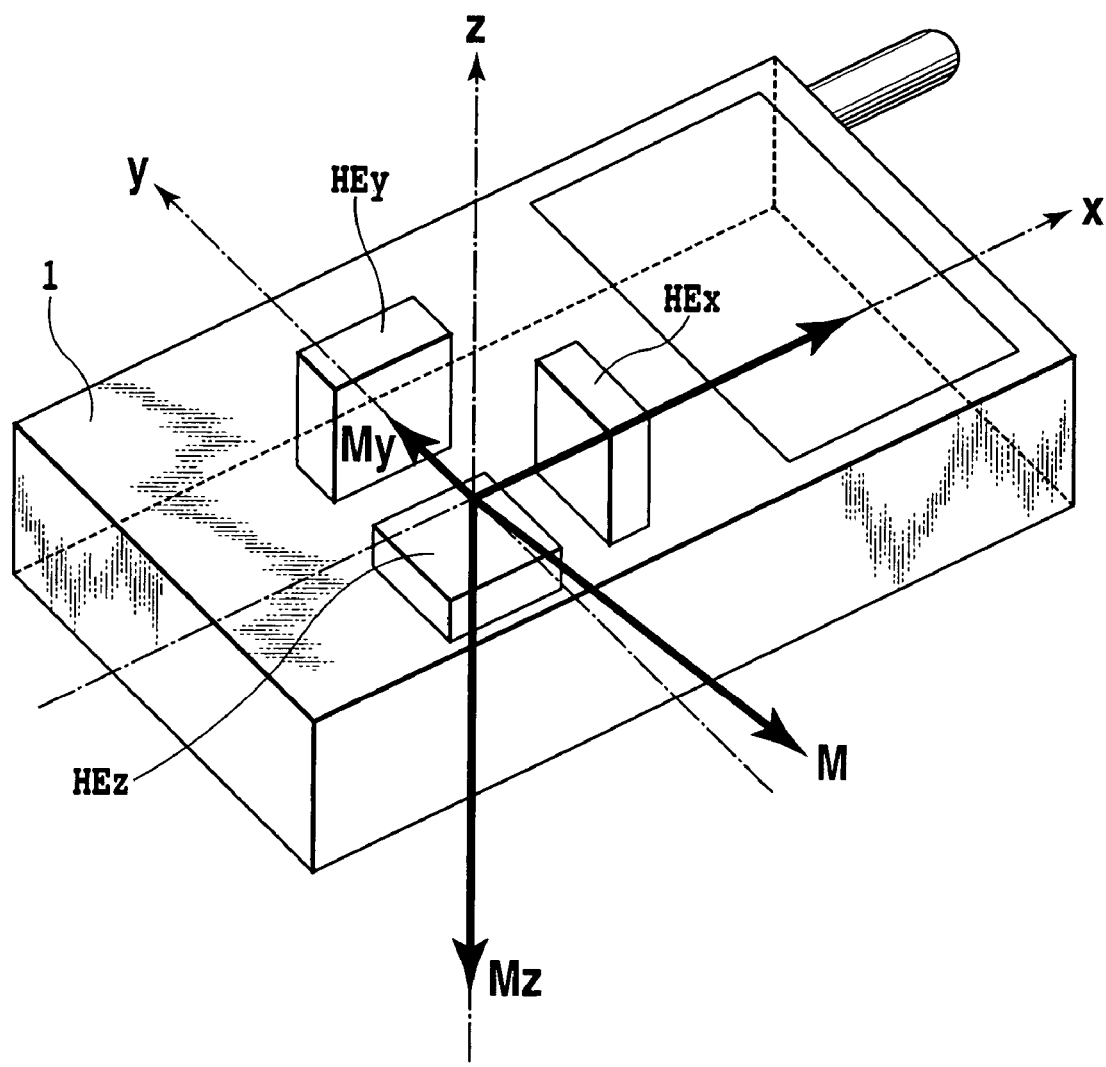
FIG. 1 is a perspective view showing a mounting structure of magnetic field sensors in an azimuth measuring device of an embodiment of the present invention.

The present invention is hereinafter described in detail with reference to the accompanying drawings. FIG. 1 is a perspective view showing a mounting structure of magnetic field sensors in an azimuth measuring device. In FIG. 1, the axis of coordinates x, y, and z are based on an azimuth measuring device 1; and the x-axis, y-axis, and z-axis are parallel with a longitudinal direction, a transverse direction, and a thickness direction of the azimuth measuring device 1, respectively. The azimuth measuring device 1 is provided with an x-axis magnetic field sensor HEx, a y-axis magnetic field sensor HEy, and a z-axis magnetic field sensor HEz; and these are located in the directions such that the x-axis magnetic field sensor HEx detects an x-direction component Mx of earth magnetism M; the y-axis magnetic field sensor HEy detects a y-direction component My of earth magnetism M; and the z-axis magnetic field sensor HEz detects a z-direction component Mz of earth magnetism M.

Figure 2:
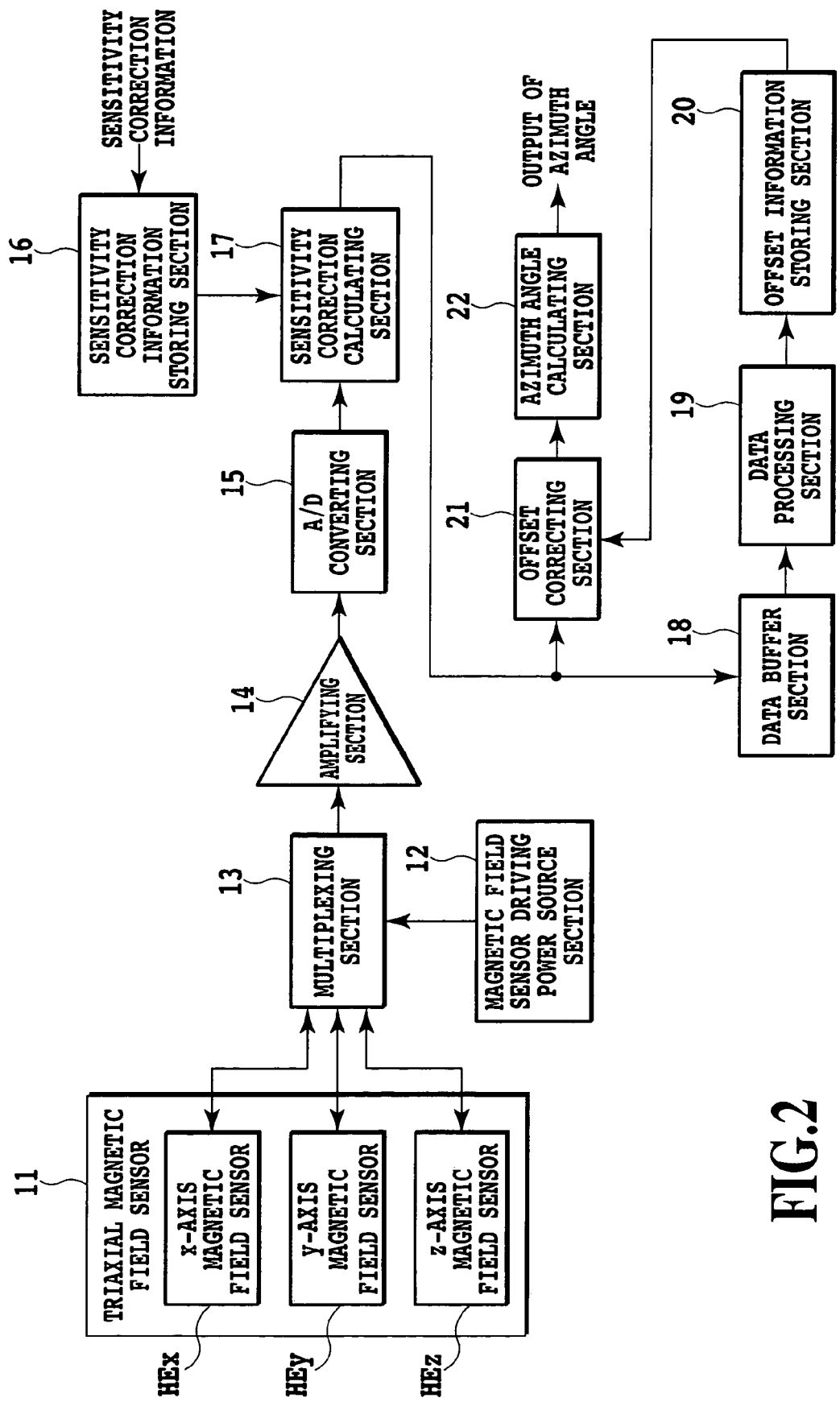
FIG. 2 is a block diagram showing a constitution of an azimuth measuring device of an embodiment of the present invention.
Figure 3:
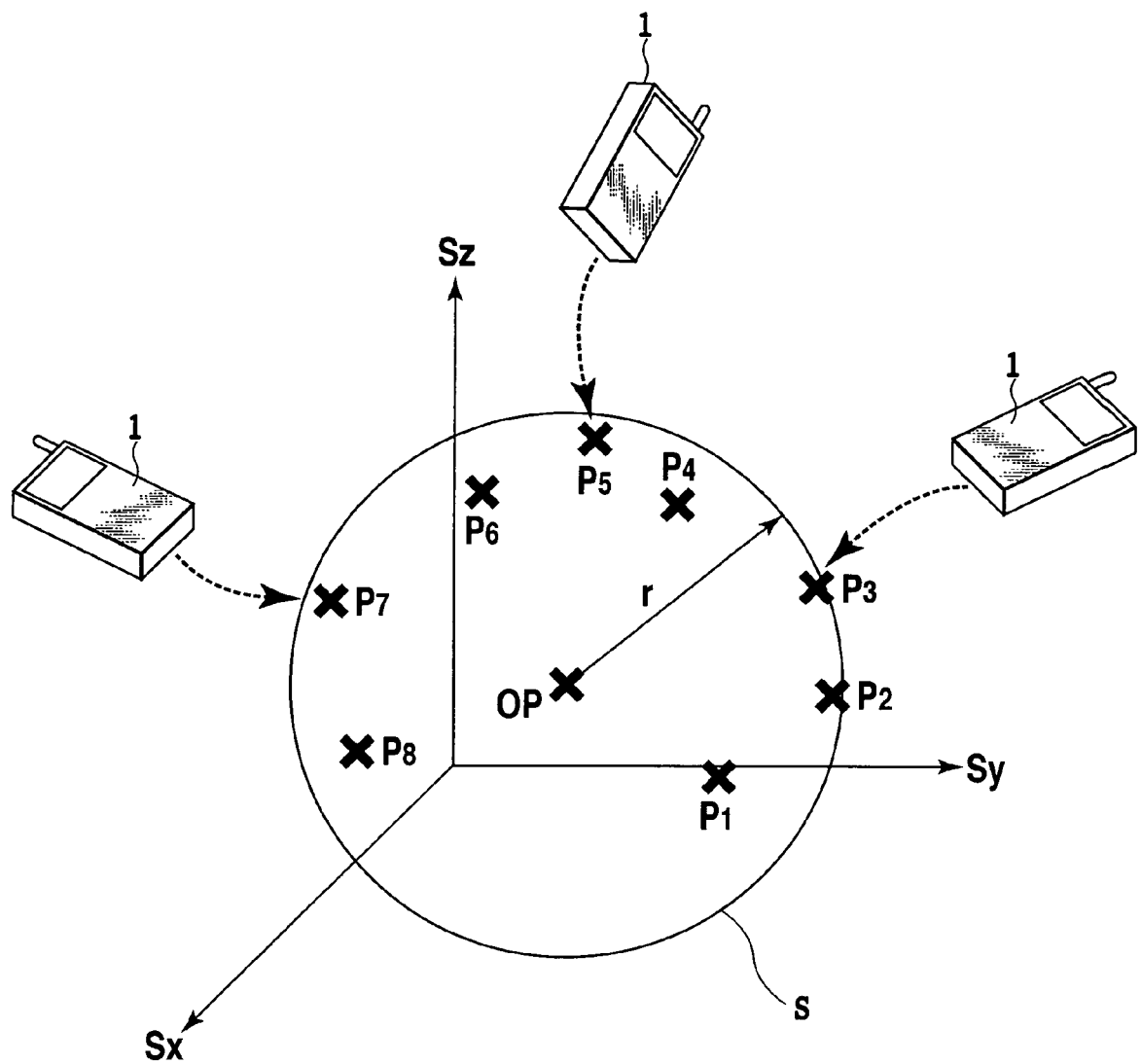
FIG. 3 is a view explaining a concept of a method for obtaining offset information in a conventional azimuth measuring device.
Figure 4:
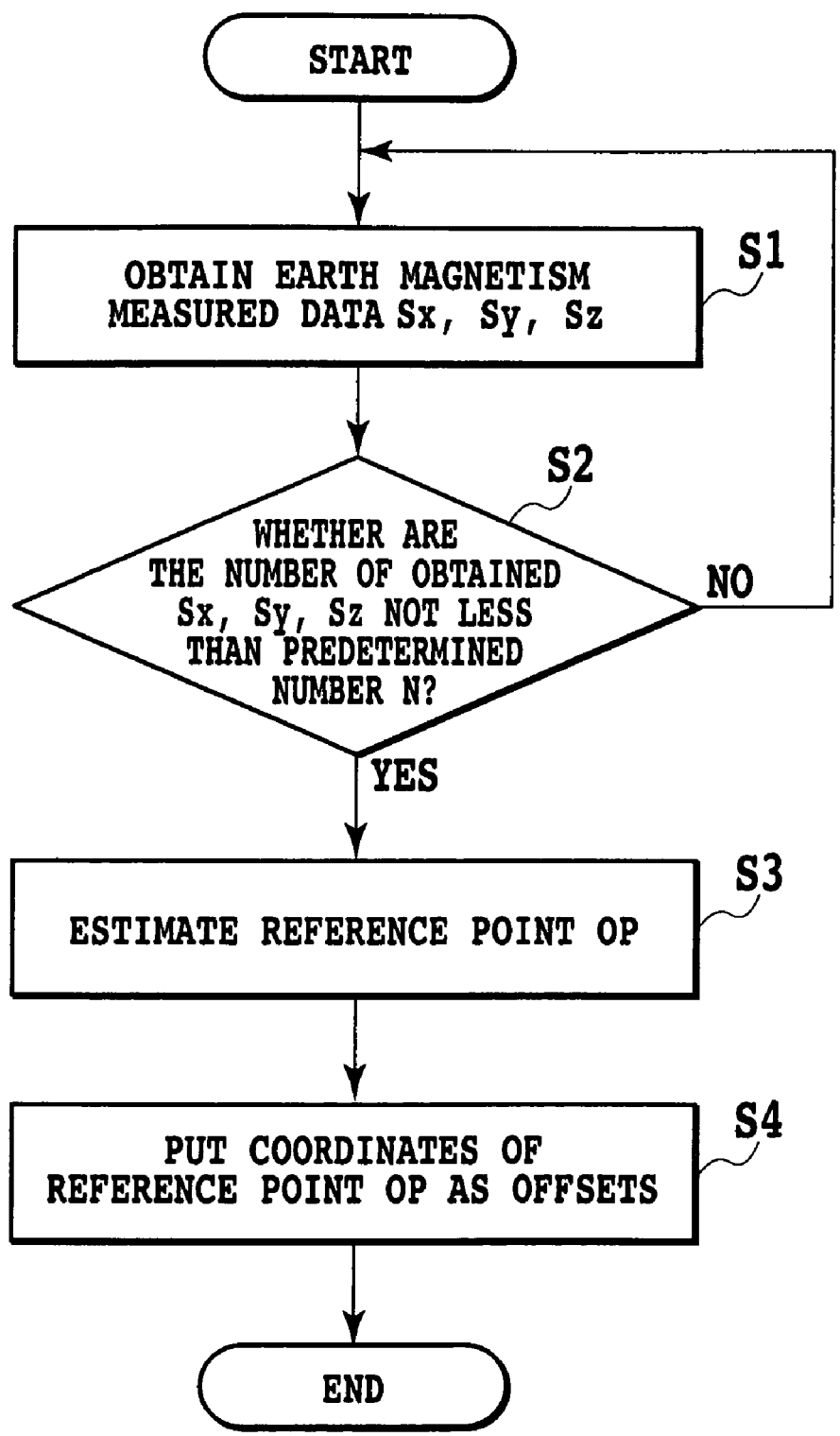
FIG. 4 is a flowchart showing a method for obtaining offset information in a conventional azimuth measuring device.

FIG. 2 is a block diagram showing a constitution of an azimuth measuring device which is the same as those in respective embodiments described hereinafter.

In FIG. 2, the azimuth measuring device 1 is provided with a triaxial magnetic field sensor 11, a magnetic field sensor driving power source section 12, a multiplexing section 13, an amplifying section 14, an A/D converting section 15, a sensitivity correction information storing section 16, a sensitivity correction calculating section 17, a data buffer section 18, a data processing section 19, an offset information storing section 20, an offset correcting section 21, and an azimuth angle calculating section 22.

In the triaxial magnetic field sensor 11, an x-axis magnetic field sensor HEx, a y-axis magnetic field sensor HEy, and a z-axis magnetic field sensor HEz are provided, and respectively output sensor signals for detecting x-direction component Mx, y-direction component My, and z-direction component Mz of earth magnetism M.

The magnetic field sensor driving power source section 12 outputs a driving voltage required for the operations of the x-axis magnetic field sensor HEx, the y-axis magnetic field sensor HEy, and the z-axis magnetic field sensor HEz.

The multiplexing section 13 switches the x-axis magnetic field sensor HEx, the y-axis magnetic field sensor HEy, and the z-axis magnetic field sensor HEz. The multiplexing section 13 applies in time sharing an output voltage of the magnetic field sensor driving power source section 12 to the x-axis magnetic field sensor HEx, the y-axis magnetic field sensor HEy, and the z-axis magnetic field sensor HEz; and sequentially outputs sensor signals outputted from the x-axis magnetic field sensor HEx, the y-axis magnetic field sensor HEy, and the z-axis magnetic field sensor HEz. The amplifying section 14 sequentially amplifies sensor signals outputted from the multiplexing section 13. The A/D converting section 15 performs sequentially A/D conversion on sensor signals amplified with the amplifying section 14 to be sequentially outputted as x-axis geomagnetic measured data, y-axis geomagnetic measured data, and z-axis geomagnetic measured data.

The sensitivity correction information storing section 16 stores predetermined sensitivity correction information. The sensitivity correction calculating section 17 corrects the sensitivities of geomagnetic measured data outputted from the A/D converting section 15 based on sensitivity correction information stored in the sensitivity correction information storing section 16.

The data buffer section 18 holds a predetermined number of geomagnetic measured data, the sensitivities of which have been corrected by the sensitivity correction calculating section 17 and which are used for calculating offset information.

Reference numeral 19 denotes a data processing section, and performs respective processes described in detail below based on data in the data buffer section 18. Respective processes to be performed here are achieved by executing predetermined programs (including, for example, control steps shown in FIGS. 8, 12 and 15) stored in a ROM using a CPU. A RAM provides a work area to the CPU. The CPU, ROM, and the RAM can be constituted such that functions executed with constituting elements denoted by reference numerals 16 to 18 and 20 to 22 are achieved. The data processing section 19 reads geomagnetic measured data held in the data buffer section 18, and calculates offset information by executing a process to be described later.

The offset information storing section 20 stores offset information outputted from the data processing section 19.

The offset correcting section 21 corrects offsets of geomagnetic measured data, the sensitivities of which have been corrected with the sensitivity correction calculating section 17, based on offset information stored in the offset information storing section 20.

The azimuth angle calculating section 22 calculates azimuth angles based on geomagnetic measured data which have been corrected with the offset correcting section 21.

First Embodiment

Figure 7:
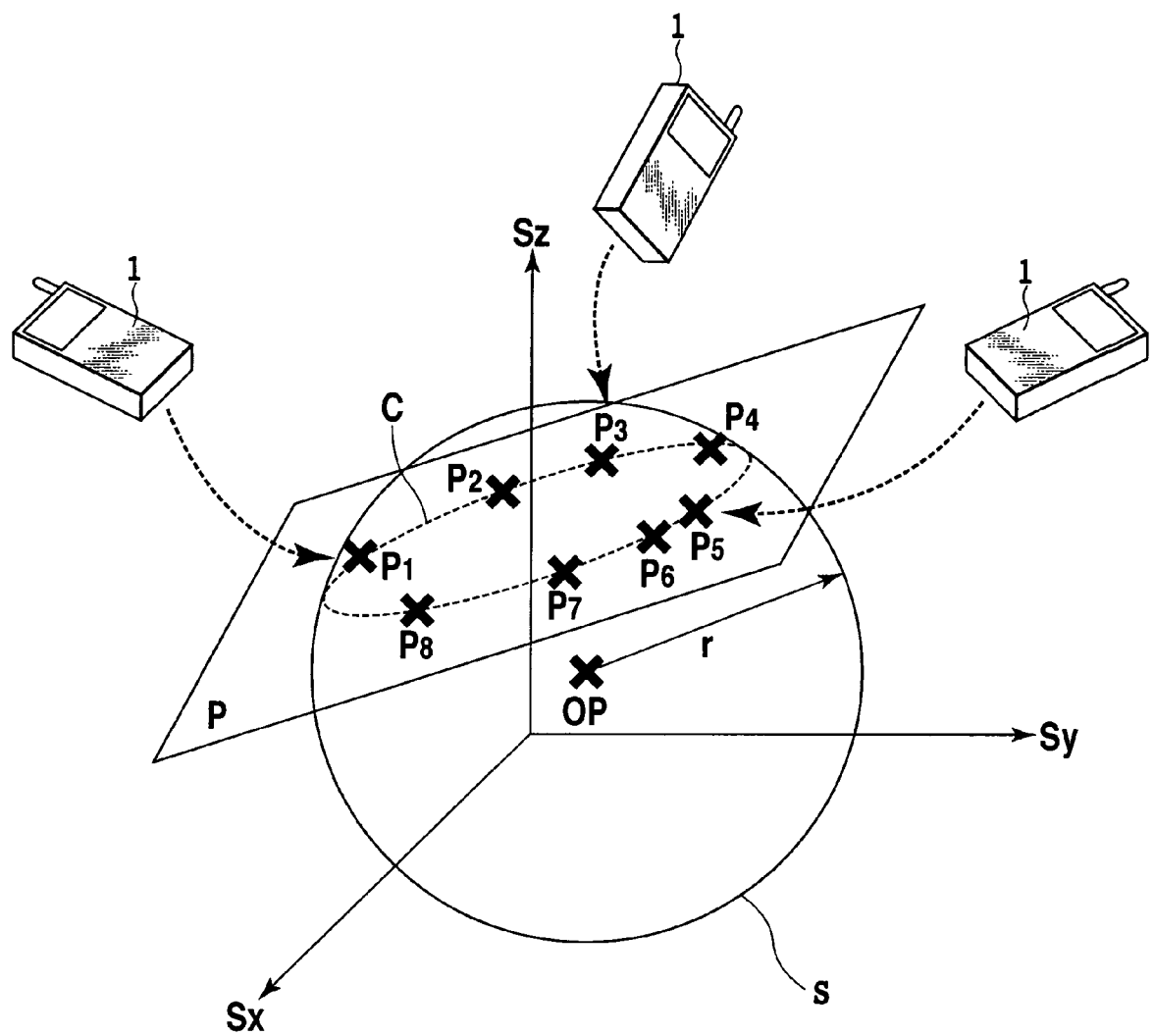
FIG. 7 is a view explaining a concept of a method for avoiding the obtaining of erroneous offset information in an embodiment of the present invention.

FIG. 7 is a view explaining a concept of a method for avoiding the obtaining of erroneous offset information in a first embodiment of the present invention.

Figure 5:
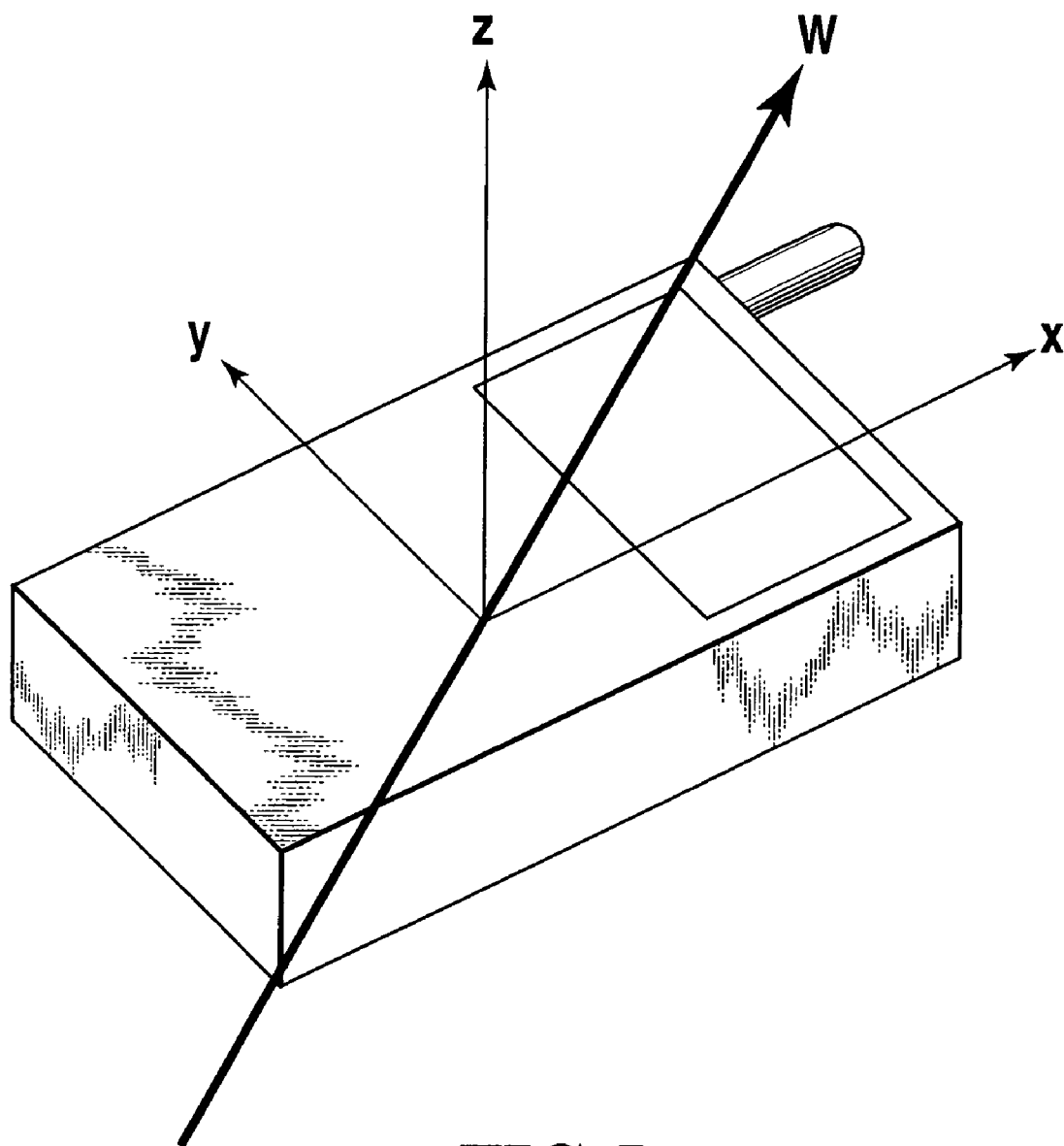
FIG. 5 is a view showing a magnetic field sensor which holds an attitude with respect to a specific direction W in the present invention.
Figure 6:
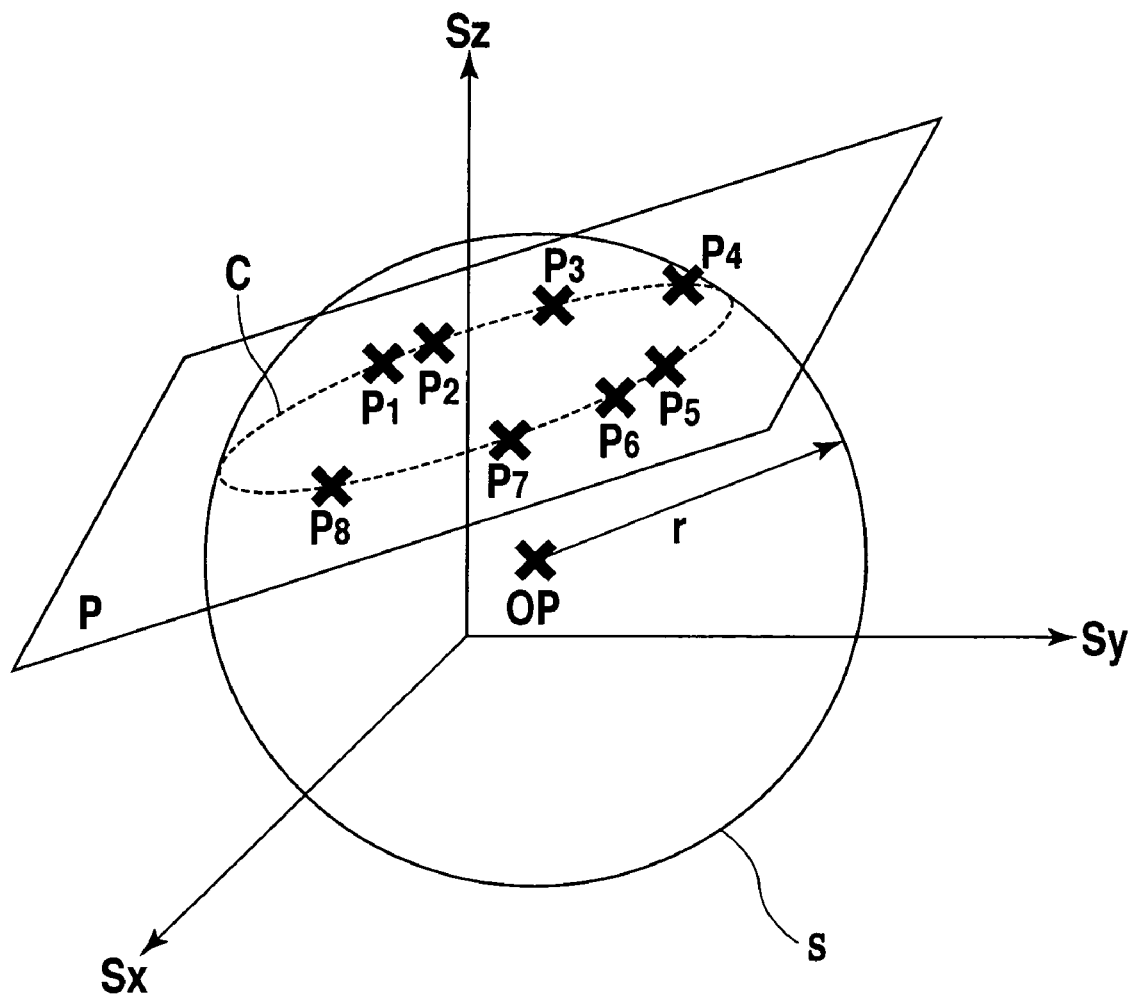
FIG. 6 is a view explaining a problem for a conventional azimuth measuring device.

In FIG. 7, the direction of an azimuth measuring device 1 is arbitrarily changed, and, in the meantime, x-axis geomagnetic measured data Sx, y-axis geomagnetic measured data Sy, and z-axis geomagnetic measured data Sz are repeatedly obtained until the number of the data reaches a predetermined number N. Although it is preferable that the direction of the azimuth measuring device 1 be arbitrarily changed, it is assumed that, as shown in FIG. 5, there may be a case where the direction of the azimuth measuring device 1 is changed while retaining its attitude with respect to a specific direction W.

Individual data of Sx, Sy, and Sz having been repeatedly obtained are set as P1(S1x, S1y, S1z), P2(S2x, S2y, S2z), P3(S3x, S3y, S3z), . . . , and as shown in FIG. 7, they are placed in a three dimensional space by relating the values of Sx, Sy, and Sz to the direction components of respective axes.

Next, it is determined whether P1(S1x, S1y, S1z), P2(S2x, S2y, S2z), P3(S3x, S3y, S3z), . . . are distributed in the vicinity of a specific plane P because the direction of the azimuth measuring device 1 has been changed with its attitude retained with respect to a specific direction W. As a method of determination, it is enough to determine whether or not a matrix consisted of coefficients of a system of linear equations with respect to Cx, Cy, and Cz in Eq. (7) above, i.e.

[Equation 8]

$$A = \begin{bmatrix} \sum Si_x(Si_x - \overline{S_x}) & \sum Si_y(Si_x - \overline{S_x}) & \sum Si_z(Si_x - \overline{S_x}) \\ \sum Si_x(Si_y - \overline{S_y}) & \sum Si_y(Si_y - \overline{S_y}) & \sum Si_z(Si_y - \overline{S_y}) \\ \sum Si_x(Si_z - \overline{S_z}) & \sum Si_y(Si_z - \overline{S_z}) & \sum Si_z(Si_z - \overline{S_z}) \end{bmatrix} \quad (12)$$

is singular matrix or nearly singular matrix; and to be more precise, the absolute value |det(A)| of the determinant of the equation (12) above is calculated, and if it is close to zero, it is determined that P1(S1x, S1y, S1z), P2(S2x, S2y, S2z), P3(S3x, S3y, S3z), . . . are distributed in the vicinity of a specific plane P.

Incidentally, the determinant of Eq. (12) is definitely positive unless there is a calculation error such as a quantization error occurring in rounding values. Accordingly, the determinant is calculated, and if it is close to zero or negative, it maybe determined that P1(S1x, S1y, S1z), P2(S2x, S2y, S2z), P3(S3x, S3y, S3z), . . . are distributed in the vicinity of a specific plane P.

The magnitude of earth magnetism varies depending on the place. Especially, earth magnet ism varies to a large extent inside and around man-made structures. Since the determinant of the above matrix is roughly proportional to sixth power of the magnitude (=r) of earth magnetism, $det(A)/r^6$ is calculated, and if it is close to zero or negative, it may be also determined that P1(S1x, S1y, S1z), P2(S2x, S2y, S2z), P3(S3x, S3y, S3z), . . . are distributed in the vicinity of a specific plane P.

Moreover, as another method for determining whether P1(S1x, S1y, S1z), P2(S2x, S2y, S2z), P3(S3x, S3y, S3z), . . are distributed in the vicinity of a specific plane P, a plane P is estimated based on P1(S1x, S1y, S1z), P2(S2x, S2y, S2z), P3(S3x, S3y, S3z), . . . ; and distances from P1(S1x, S1y, S1z), P2(S2x, S2y, S2z), P3(S3x, S3y, S3z), . . . to the estimated plane P are calculated, and it can be determined whether the calculated distances are not greater than predetermined values. Setting an equation for the plane P to be estimated as $$aS_x + bS_y + cS_z + d = 0 \quad (13)$$

where $a^2 + b^2 + c^2 = 1$ \quad (14)

then, a, b, and c above can be calculated.

Distances ε from P1(S1x, S1y, S1z), P2(S2x, S2y, S2z), P3(S3x, S3y, S3z), . . . to the estimated plane P can be, for example, calculated by the following equation.

[Equation 9]

$$\varepsilon = \sqrt{\frac{1}{N} \sum (aSi_x + bSi_y + cSi_z + d)^2} \quad (15)$$

The equation for the plane P to be estimated is set as $$aS_x + bS_y + cS_z + d = 0 \quad (A)$$

Respective coefficients of the above equation (A) are solved as follows.

[Equation 10]

Setting as, $$XX = Si_x(Si_x - \overline{Si_x})$$

$$YY = Si_y(Si_y - \overline{Si_y})$$

$$ZZ = Si_z(Si_z - \overline{Si_z})$$

$$XY = Si_x(Si_y - \overline{Si_y}) = Si_y(Si_x - \overline{Si_x})$$

$$YZ = Si_y(Si_z - \overline{Si_z}) = Si_z(Si_y - \overline{Si_y})$$

$$ZX = Si_z(Si_x - \overline{Si_x}) = Si_x(Si_z - \overline{Si_z})$$

[Equation 11]

$$Det0 = YY \times ZZ - YZ \times YZ$$

$$Det1 = ZZ \times XX - ZX \times ZX$$

$$Det2 = XX \times YY - XY \times XY$$

are calculated to find the maximum value. Depending on which equation produces the maximum value, a corresponding system of liner equations described below is solved for deriving respective coefficients. Respective equations are those for estimating a plane P when a=1, b=1, or c=1; and Det0, Det1, and Det2 correspond to the determinants of respective coefficient matrices. In general, since the larger the value of the determinant is the more the accuracy of a numerical calculation is improved, the coefficients a, b, and c are obtained by solving an equation that the value of determinant takes the largest value.

When Det0 is largest (at this time, a=1),

[Equation 12]

$$\begin{bmatrix} YY & YZ \\ YZ & ZZ \end{bmatrix} \begin{bmatrix} b \\ c \end{bmatrix} = -\begin{bmatrix} XY \\ ZX \end{bmatrix}$$

When Det1 is largest (at this time, b=1),

[Equation 13]

$$\begin{bmatrix} ZZ & ZX \\ ZX & XX \end{bmatrix} \begin{bmatrix} c \\ a \end{bmatrix} = -\begin{bmatrix} YZ \\ XY \end{bmatrix}$$

When Det2 is largest (at this time, c=1),

[Equation 14]

$$\begin{bmatrix} XX & XY \\ XY & YY \end{bmatrix} \begin{bmatrix} a \\ b \end{bmatrix} = -\begin{bmatrix} ZX \\ YZ \end{bmatrix}$$

Furthermore, setting

[Equation 15]

$$d = -\frac{1}{N} \sum (aSi_x + bSi_y + cSi_z)$$

the distance di from each point of P1(S1x, S1y, S1z), P2(S2x, S2y, S2z), P3(S3x, S3y, S3z), . . . to the plane P is obtained by $$di = \frac{aSi_x + bSi_y + cSi_z + d}{\sqrt{a^2 + b^2 + c^2}} \quad (16)$$

Figure 16:
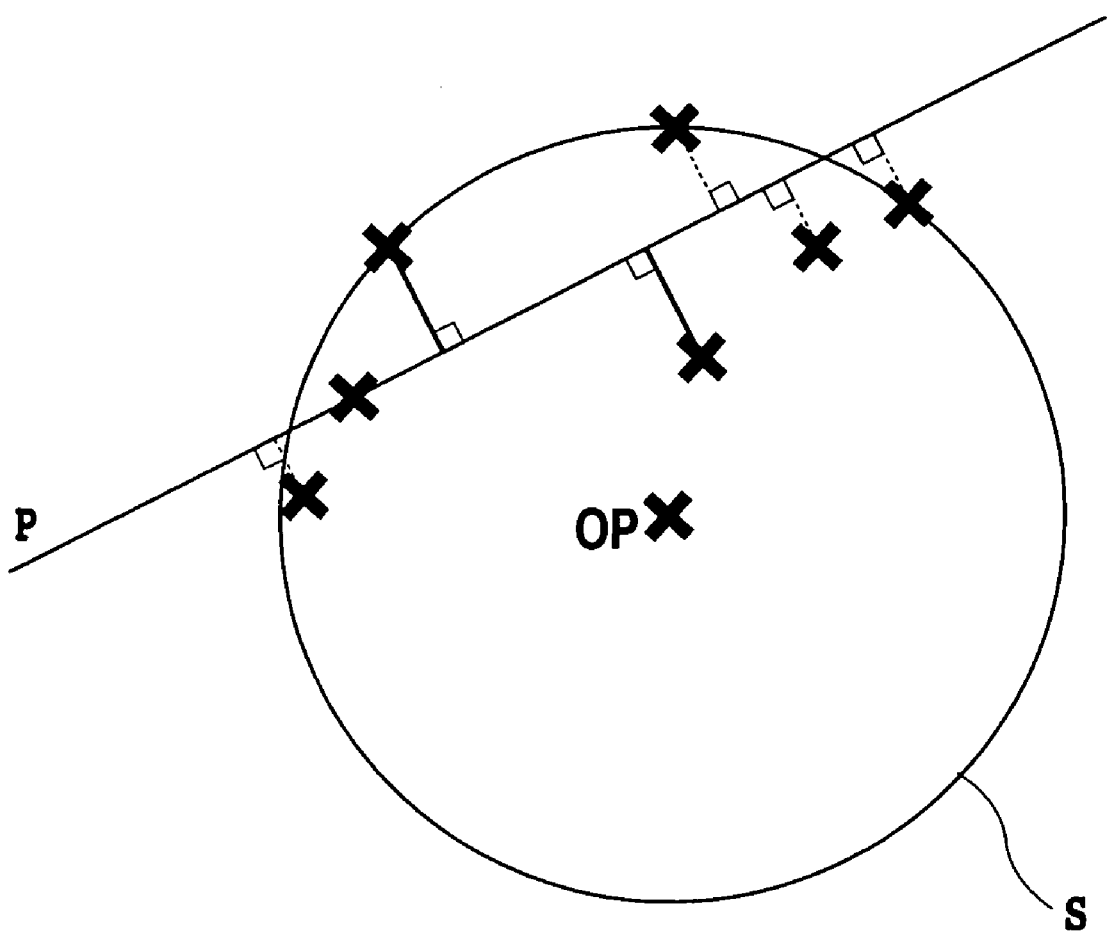
FIG. 16 is a view explaining a concept of a method for obtaining offset information in an embodiment of the present invention.

Whether the distance di for each point is positive or negative is depending on which side of two domains separated by the estimated plane P the each point belongs. That is, the distance di from a point belonging to one of the two separated domains to the plane P is positive, while the distance di from a point belonging to another domain is negative. The maximum value and the minimum value in the distances di for these respective points are obtained (FIG. 16), and depending on whether the difference of these values is not greater than a predetermined value, it may be also determined whether P1(S1x, S1y, S1z), P2(S2x, S2y, S2z), P3(S3x, S3y, S3z), . . . are distributed in the vicinity of a specific plane p.

In other word, the above determination may be done whether the summation of the absolute value of a distance between a farthermost point from a designated plane P and the plane P in one of two domains separated by the designated plane P, and the absolute value of a distance between a farthermost point from a designated plane P and the plane P in another domain is not greater than a predetermined value.

When it is determined that P1(S1x, S1y, S1z), P2(S2x, S2y, S2z), P3(S3x, S3y, S3z), . . . are distributed in the vicinity of a specific plane P, the above equation (7) is not calculated for finding a solution. In addition, when the calculation for solving the above equation (7) has already been performed, the calculated solution is deleted, and the calculation of offset information is not performed. On the other hand, when it is not determined that P1(S1x, S1y, S1z), P2(S2x, S2y, S2z), P3(S3x, S3y, S3z), . . . are distributed in the vicinity of a specific plane P, the above equation (7) is calculated to estimate a reference point OP, and offsets Cx, Cy, and Cz are obtained based on the coordinates thereof.

Thus, it becomes possible to prevent the occurrence of the problem that erroneous offset information is obtained when the direction of the azimuth measuring device is changed while retaining its attitude with respect to a specific direction without being arbitrarily changed in the period of obtaining data.

Incidentally, when it is determined that P1(S1x, S1y, S1z), P2(S2x, S2y, S2z), P3(S3x, S3y, S3z), . . . are distributed in the vicinity of a specific plane P, a warning notice may be displayed on a display section of the azimuth measuring device 1. This enables a user of the azimuth measuring device 1 to notice that the operation of changing the direction of the azimuth measuring device 1 is not proper in obtaining Sx, Sy, and Sz.

Figure 8:
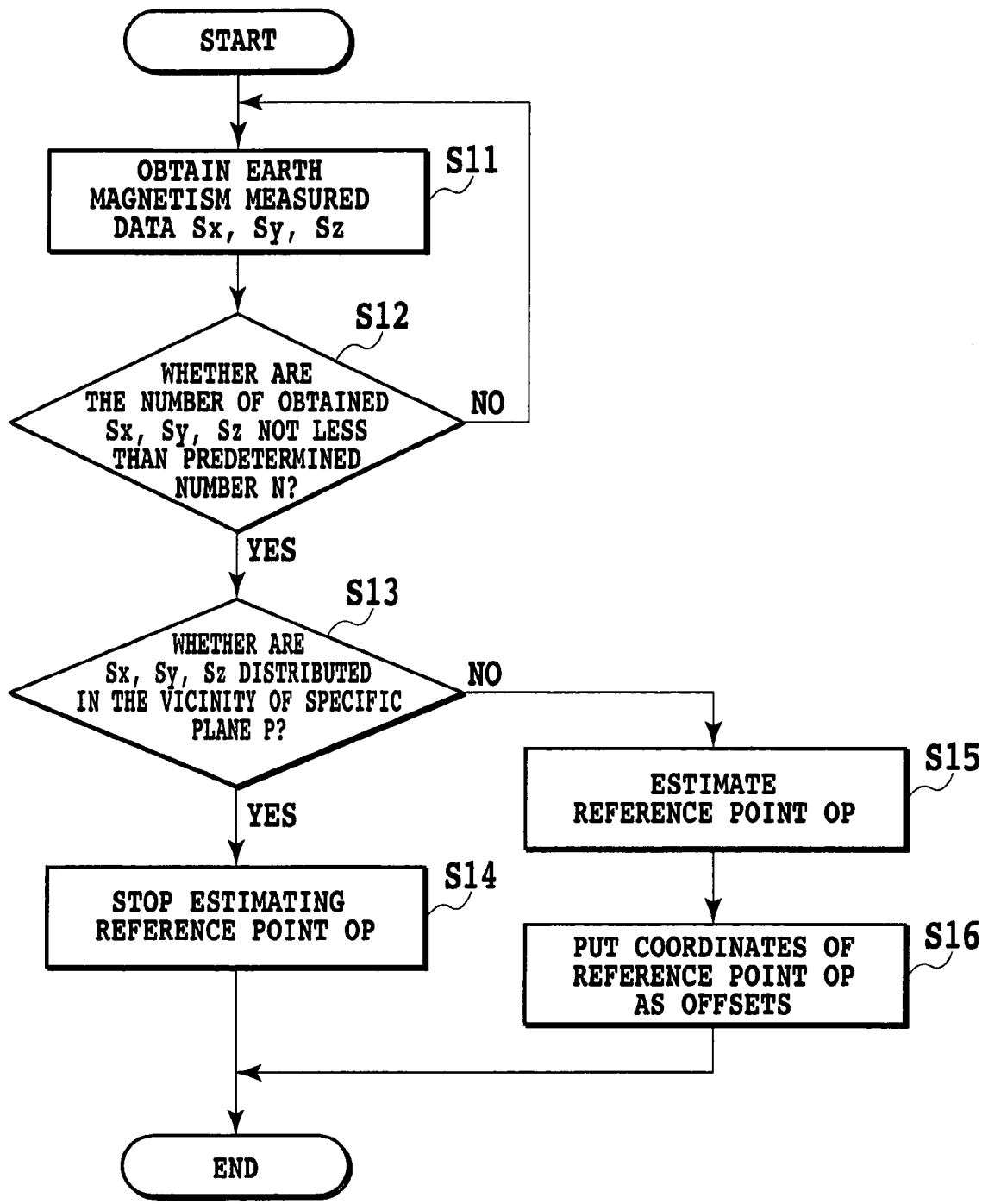
FIG. 8 is a flowchart showing a method for avoiding the obtaining of erroneous offset information in an embodiment of the present invention.

FIG. 8 is a flowchart showing a method for avoiding the obtaining of erroneous offset information in the first embodiment of the present invention.

In FIG. 8, the data buffer section 18 obtains geomagnetic measured data Sx, Sy, and Sz, and inputs them into a buffer. When it is considered that the obtained geomagnetic measured data Sx, Sy, and Sz are not adequate due to the mixing-in of noises and the like, the obtained geomagnetic measured data Sx, Sy, and Sz may not be inputted into the buffer. (Step S11)

Next, it is determined whether the number of geomagnetic measured data Sx, Sy, and Sz which have been retained in the data buffer 18 have reached a predetermined number N of data to be obtained. (Step S12)

When the number of geomagnetic measured data Sx, Sy, and Sz which have been retained in the data buffer 18 have not reached the predetermined number N of data to be obtained, the process returns to Step S11.

On the other hand, when the number of geomagnetic measured data Sx, Sy, and Sz which have been retained in the data buffer 18 have reached the predetermined number N of data to be obtained, the data processing section 19 reads, from the data buffer section 18, geomagnetic measured data Sx, Sy, and Sz to the number of which corresponds to the predetermined number N of data to be obtained, and it is then determined whether the individual data P1(S1x, S1y, S1z), P2(S2x, S2y, S2z), P3(S3x, S3y, S3z), . . . which are read are distributed in the vicinity of a specific plane P. Note that, after reading, from the data buffer section 18, the geomagnetic measured data Sx, Sy, and Sz to the number of which corresponds to the predetermined number. N of data to be obtained, depending on the state, the oldest data among the geomagnetic measured data Sx, Sy, and Sz retained in the data buffer section 18 may be cleared, or the data to the number of which corresponds to the number of read data may be cleared. (Step S13)

When it is determined that P1(S1x, S1y, S1z), P2(S2x, S2y, S2z), P3(S3x, S3y, S3z), . . . are distributed in the vicinity of a specific plane P, the estimating of the coordinates Cx, Cy, and Cz of the reference point OP is halted. Depending on the state, the geomagnetic measured data Sx, Sy, and Sz retained in the data buffer section 18 may be cleared. (Step 14)

On the other hand, when it is not determined that P1(S1x, S1y, S1z), P2(S2x, S2y, S2z), P3(S3x, S3y, S3z), . . . are distributed in the vicinity of a specific plane P, the coordinates Cx, Cy, and Cz of the reference point OP is estimated such that the variation of distances from individual data P1(S1x,S1y,S1z), P2(S2x,S2y,S2z), P3(S3x, S3y, S3z), . . . is minimum. (Step S15)

Then, the coordinates Cx, Cy, and Cz of the reference point OP are stored in the offset information storing section 20 as the offsets of the geomagnetic measured data Sx, Sy, and Sz. Note that, when it is considered that the coordinates Cx, Cy, and Cz of the estimated reference point OP are not adequate because of the mixing-in of noises, the presence of a surrounding magnetic field, and the like, the coordinates Cx, Cy, and Cz of the estimated reference point OP may not be stored in the offset information storing section 20, or the geomagnetic measured data Sx, Sy, and Sz retained in the data buffer section 18 may be cleared depending on the state. (Step 16)

In addition, a step corresponding to Step 15 is performed prior to Step 13 to obtain a reference point OP first, and then it may be determined whether P1(S1x, S1y, S1z), P2(S2x, S2y, S2z), P3(S3x, S3y, S3z), . . . are distributed in the vicinity of a specific plane P.

Second Embodiment

Figure 9:
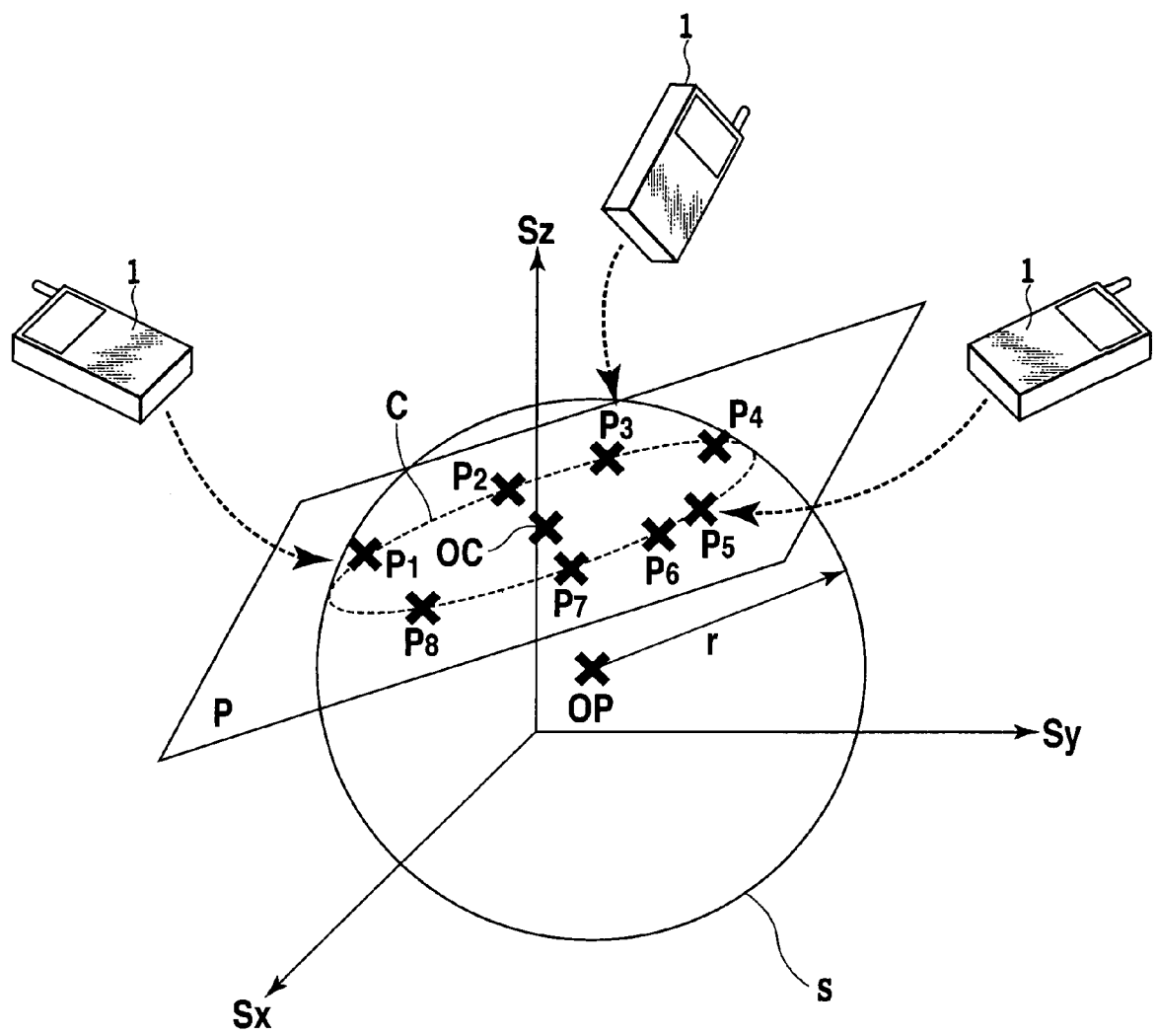
FIG. 9 is a view explaining a concept of a method for obtaining offset information in an embodiment of the present invention.

FIG. 9 is a view explaining a concept of a method for obtaining offset information in a second embodiment of the present invention.

Descriptions for portions which are the same as those in the first embodiment are omitted.

When it is determined that P1(S1x, S1y, S1z), P2(S2x, S2y, S2z), P3(S3x, S3y, S3z), . . . are distributed in the vicinity of a specific plane P, the estimation of a specific plane P is carried out. Since a method of estimating the specific plane P is the same as that described in the first embodiment, the description thereof is omitted.

Subsequently, P1(S1x, S1y, S1z), P2(S2x, S2y, S2z), P3(S3x, S3y, S3z), . . . are projected onto the estimated plane P, and a position where the variation of distances from P1(S1x, S1y, S1z), P2(S2x, S2y, S2z), P3(S3x, S3y, S3z), . . . projected on the estimated plane P is minimum is calculated using a statistical method, and the point thus calculated is set as a temporary reference point OC.

Figure 10:
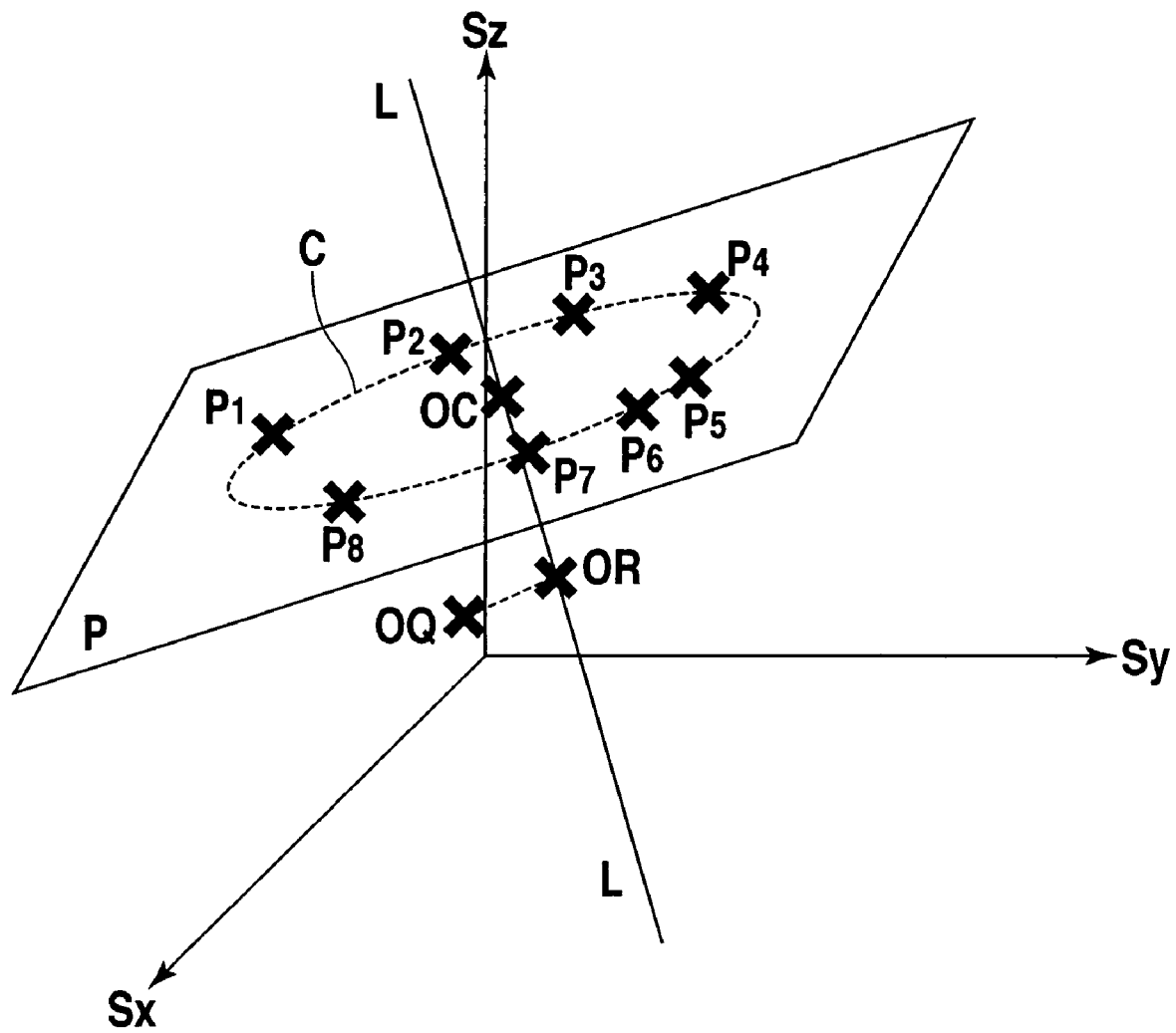
FIG. 10 is a view explaining a concept of a method for obtaining offset information in an embodiment of the present invention.

Then, the temporary reference point OC is corrected and set as a reference point OR, and the coordinates ORx, ORy, and ORz thereof are respectively obtained as values corresponding to offsets Cx, Cy, and Cz. As a method of correction, as shown in FIG. 10, it is appropriate that a point closest to a reference point OQ previously estimated is set as the point OR passing through the temporary reference point OC on a line L perpendicular to the plane P.

Figure 11:
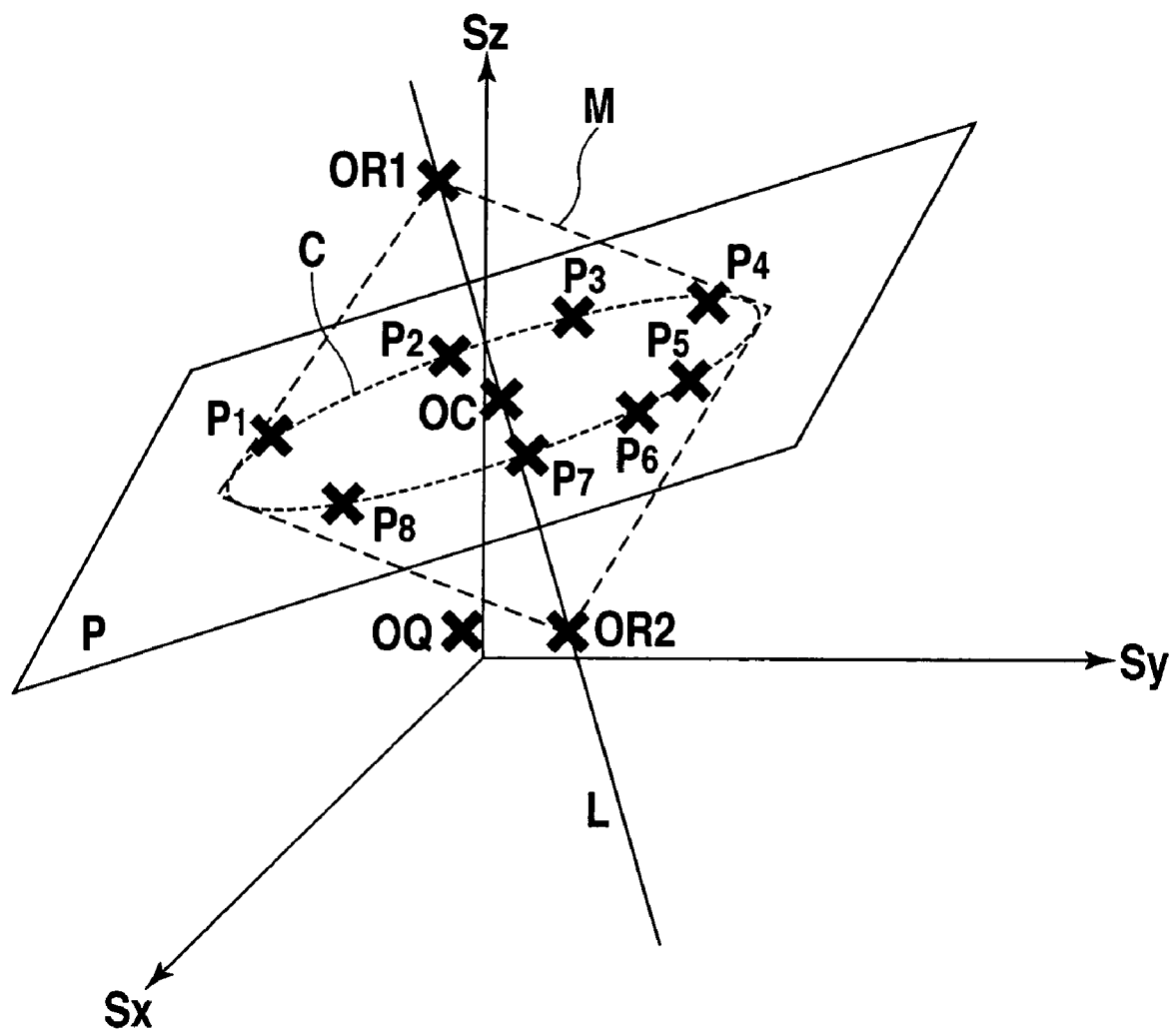
FIG. 11 is a view explaining a concept of a method for obtaining offset information in an embodiment of the present invention.

Moreover, as shown in FIG. 11, a mean value $r_c$ of the distances from P1(S1x, S1y, S1z), P2(S2x, S2y, S2z), P3(S3x, S3y, S3z), . . . having been projected on the plane P to the temporary reference point OC is calculated; and then a circle C with the point OC as the center and the mean value $r_c$ as the radius is defined, and any one of the positions OR1 and OR2, to which the distances from the circle C are equal to a predetermined value M, may be selected and set as a reference point OR. As a method of selection, for example, there is a method in which one being closer to a reference point OQ previously estimated is selected. As the value M, it is appropriated that a value corresponding to a total intensity of earth magnetism is set.

On the other hand, when it is not determined that P1(S1x, S1y, S1z), P2(S2x, S2y, S2z), P3(S3x, S3y, S3z), . . . are distributed in the vicinity of a specific plane P, the above equation (7) is calculated to estimate a reference point OP, offsets Cx, Cy, and Cz are obtained based on the coordinates thereof.

Accordingly, offset information corresponding to one in the case where the direction of an azimuth measuring device changes arbitrarily can be obtained, even when the direction of an azimuth measuring device is changed while retaining its attitude with respect to a specific direction without being arbitrarily changed in the period of obtaining data.

Incidentally, when it is determined that P1(S1x, S1y, S1z), P2(S2x, S2y, S2z), P3(S3x, S3y, S3z), . . . are distributed in the vicinity of a specific plane P, a warning notice may be displayed on a display section of the azimuth measuring device 1. This enables a user of the azimuth measuring device 1 to notice the operation of changing the direction of the azimuth measuring device 1 is not proper in obtaining Sx, Sy, and Sz.

Figure 12:
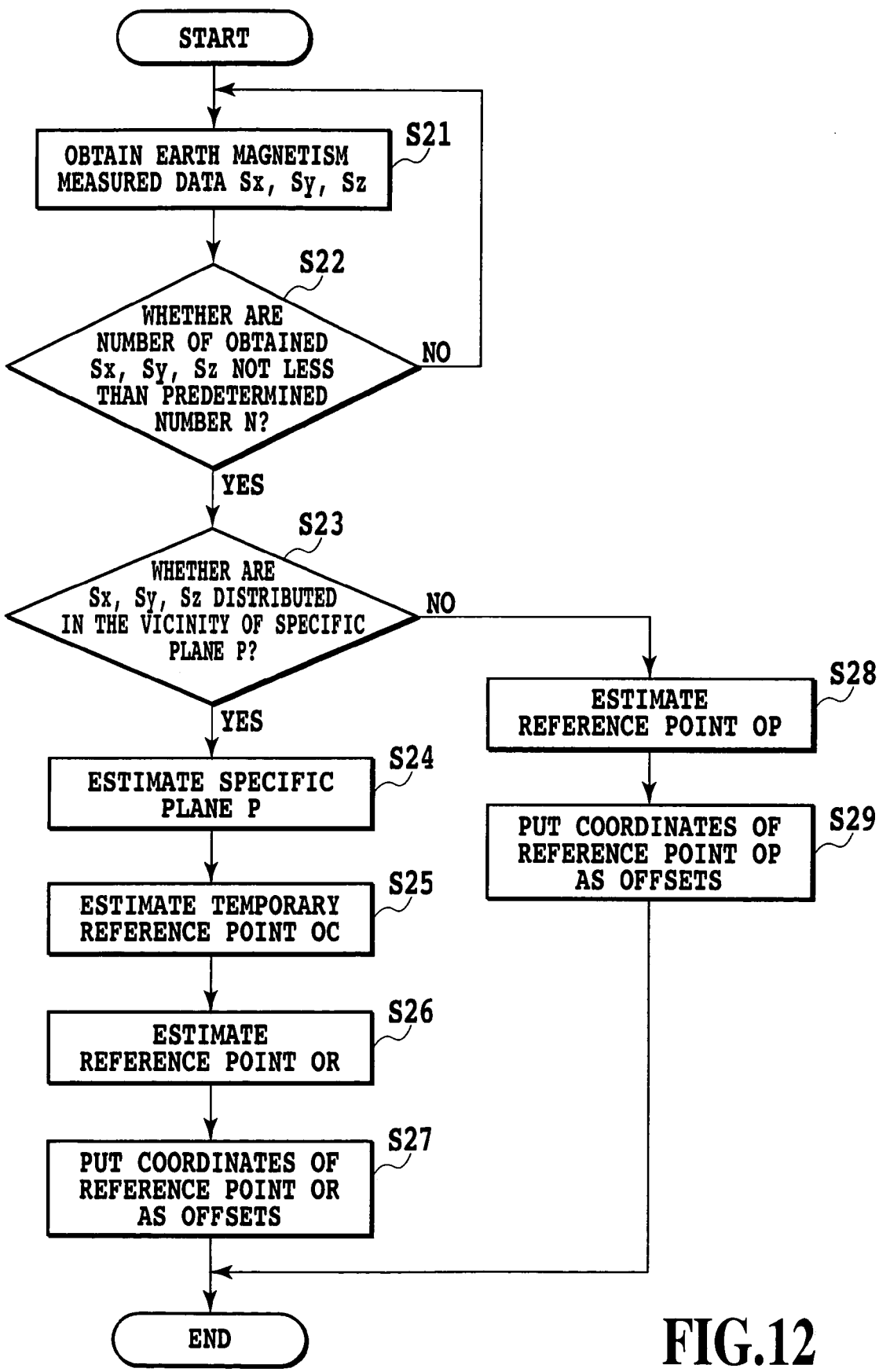
FIG. 12 is a flowchart showing a method for obtaining offset information in an embodiment of the present invention.

FIG. 12 is a flowchart showing a method for obtaining offset information in the second embodiment of the present invention.

In FIG. 12, the data buffer section 18 obtains geomagnetic measured data Sx, Sy, and Sz, and inputs them into a buffer. When it is considered that the obtained geomagnetic measured data Sx, Sy, and Sz are not adequate due to the mixing-in of noises and the like, the obtained geomagnetic measured data Sx, Sy, and Sz may not be inputted into the buffer. (Step S21)

Next, it is determined whether the number of geomagnetic measured data Sx, Sy, and Sz which have been retained in the data buffer 18 have reached a predetermined number N of data to be obtained. (Step S22)

When the number of geomagnetic measured data Sx, Sy, and Sz which have been retained in the data buffer 18 have not reached the predetermined number N of data to be obtained, the process returns to Step S21.

On the other hand, when the number of geomagnetic measured data Sx, Sy, and Sz which have been retained in the data buffer 18 have reached the predetermined number N of data to be obtained, the data processing section 19 reads, from the data buffer section 18, geomagnetic measured data Sx, Sy, and Sz to the number of which corresponds to the predetermined number N of data to be obtained, and it is then determined whether the individual data P1(S1x, S1y, S1z), P2(S2x, S2y, S2z), P3(S3x, S3y, S3z), . . . which are read are distributed in the vicinity of a specific plane P. Note that, after reading, from the data buffer section 18, the geomagnetic measured data Sx, Sy, and Sz to the number of which corresponds to the predetermined number N of data to be obtained, depending on the state, only the oldest data among the geomagnetic measured data Sx, Sy, and Sz retained in the data buffer section 18 may be cleared, or the data to the number of which corresponds to the number of read data may be cleared. (Step S23)

When it is determined that P1(S1x, S1y, S1z), P2(S2x, S2y, S2z), P3(S3x, S3y, S3z), . . . are distributed in the vicinity of a specific plane P, the estimation of a specific plane P is carried out. (Step S24)

Subsequently, P1(S1x, S1y, S1z), P2(S2x, S2y, S2z), P3(S3x, S3y, S3z), . . . are projected onto the estimated plane P, and the coordinates OCx, OCy, and OCz of a temporary reference point OC is estimated such that the variation of distances to P1(S1x, S1y, S1z), P2(S2x, S2y, S2z), P3(S3x, S3y, S3z), . . . projected on the plane P is minimum. (Step 25)

Then, the coordinates OCx, OCy, and OCz of the temporary reference point OC are corrected and set as a reference point OR, and the coordinates ORx, ORy, and ORz thereof is calculated. (Step 26)

Then, the coordinates ORx, ORy, and ORz of the reference point OR are stored in the offset information storing section 20 as the offsets of the geomagnetic measured data Sx, Sy, and Sz. Note that, when it is considered that the coordinates ORx, ORy, and ORz of the estimated reference point OR are not adequate because of the mixing-in of noises, the presence of a surrounding magnetic field, and the like, the coordinates ORx, ORy, and ORz of the estimated reference point OR may not be stored in the offset information storing section 20, or the geomagnetic measured data Sx, Sy, and Sz retained in the data buffer section 18 may be cleared depending on the state. (Step 27)

On the other hand, when it is not determined that P1(S1x, S1y, S1z), P2(S2x, S2y, S2z), P3(S3x, S3y, S3z), . . . are distributed in the vicinity of a specific plane P, the coordinates Cx, Cy, and Cz of the reference point OP is estimated such that the variation of distances from individual data P1(S1x, S1y, S1z), P2(S2x, S2y, S2z), P3(S3x, S3y, S3z), . . . is minimum. (Step S28)

Then, the coordinates Cx, Cy, and Cz of the reference point OP are stored in the offset information storing section 20 as the offsets of the geomagnetic measured data Sx, Sy, and Sz. When it is considered that the coordinates Cx, Cy, and Cz of the estimated reference point OP are not adequate because of the mixing-in of noises, the presence of a surrounding magnetic field, and the like, the coordinates Cx, Cy, and Cz of the estimated reference point OP may not be stored in the offset information storing section 20, or the geomagnetic measured data Sx, Sy, and Sz retained in the data buffer section 18 may be cleared depending on the state. (Step 29)

Third Embodiment

Figure 13:
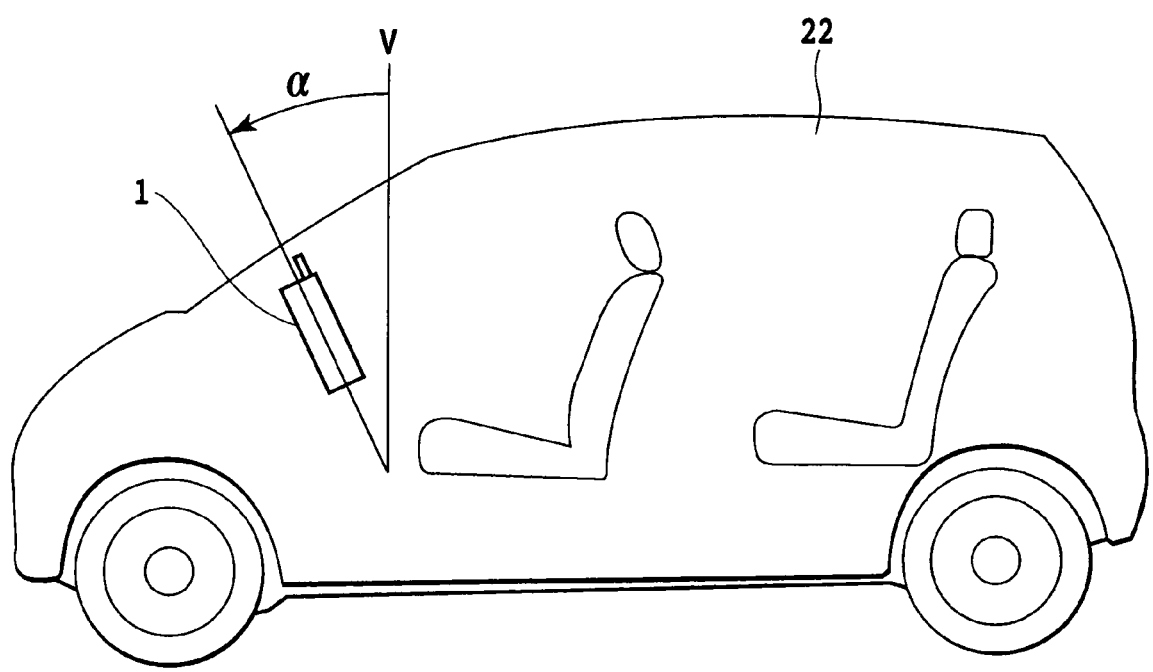
FIG. 13 is a view explaining a mounting state of an azimuth measuring device of an embodiment of the present invention.

FIG. 13 is a view explaining a mounting state of an azimuth measuring device of a third embodiment of the present invention.

In FIG. 13, an azimuth measuring device 1 is placed in a vehicle 22, and fixed at a tilt angle $\alpha$ to a vertical axis V. A change of the direction of the azimuth measuring device 1 is caused by the moving of the vehicle 22. Thus, the attitude of the azimuth measuring device 1 is retained with respect to the tilt angle $\alpha$ to the vertical axis V.

Figure 14:
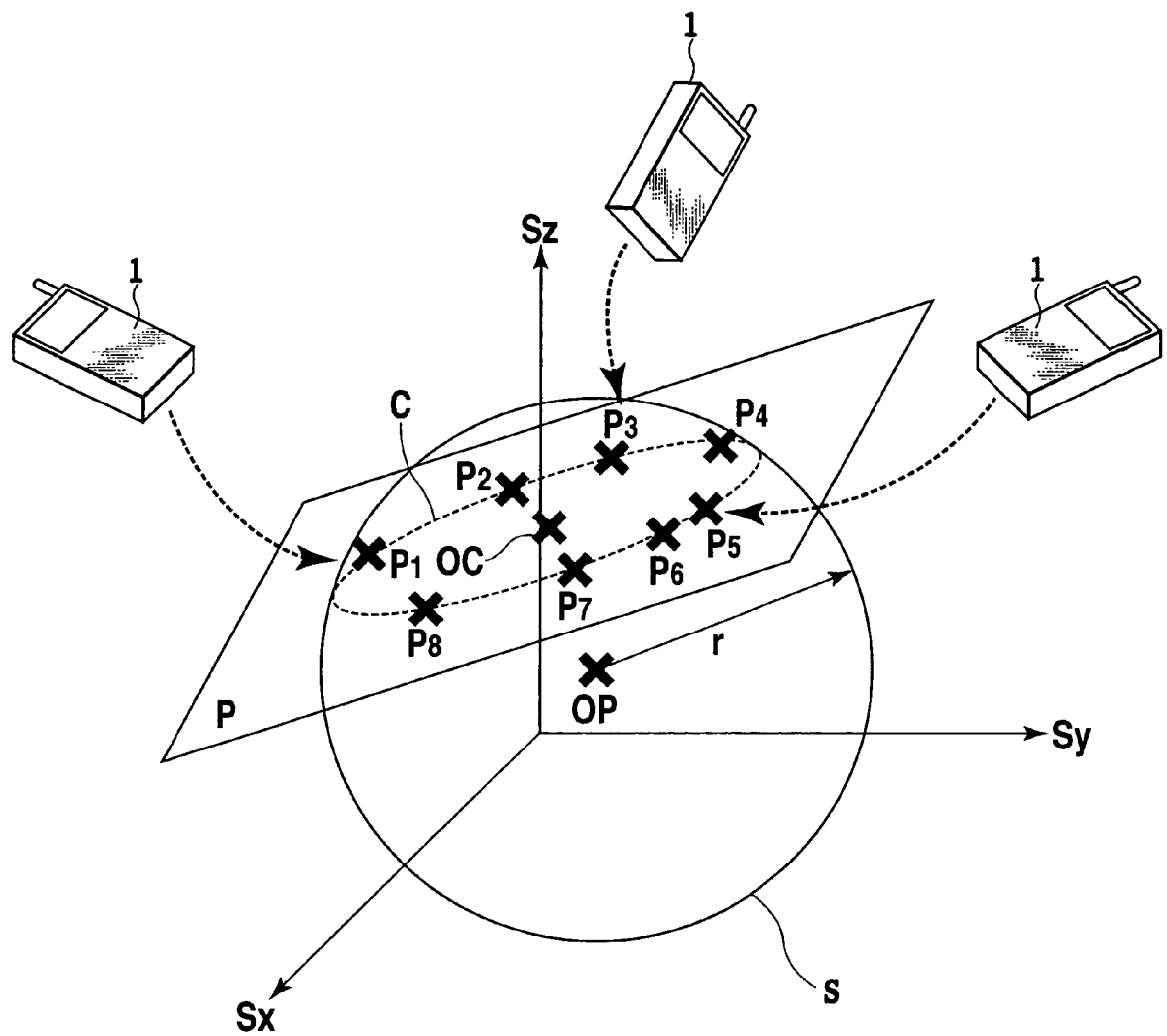
FIG. 14 is a view explaining a concept of a method for obtaining offset information in an embodiment of the present invention.

FIG. 14 is a view explaining a concept of a method for obtaining offset information in the third embodiment of the present invention.

In FIG. 14, the direction of the azimuth measuring device 1 is changed, and in the meantime, x-axis geomagnetic measured data Sx, y-axis geomagnetic measured data Sy, and z-axis geomagnetic measured data Sz are repeatedly obtained until the number of the data reaches a predetermined number N.

Individual data of Sx, Sy, and Sz having been repeatedly obtained are respectively set as P1(S1x, S1y, S1z), P2(S2x, S2y, S2z), P3(S3x, S3y, S3z), . . . , and as shown in FIG. 14, they are placed in a three dimensional space by relating the values of Sx, Sy, and Sz to the direction components of the respective axes.

At this time, since the attitude of the azimuth measuring device 1 is retained with respect to vertical axis V, P1(S1x, S1y, S1z), P2(S2x, S2y, S2z), P3(S3x, S3y, S3z), . . . are distributed in the vicinity of a specific plane P. Hence, it is not possible to calculate a solution of the above equation (7) to estimate a reference point OP, and then obtain offsets Cx, Cy, and Cz based on the coordinates thereof. Accordingly, values corresponding to the offsets Cx, Cy, and Cz are obtained based on the following steps.

First, the estimation of a specific plane P is carried out. A method of estimating the plane P is the same as that described in the first embodiment, hence, the description thereof is omitted.

Subsequently, P1(S1x, S1y, S1z), P2(S2x, S2y, S2z), P3(S3x, S3y, S3z), . . . are projected onto the estimated plane P, and a position where the variation of distances from P1(S1x, S1y, S1z), P2(S2x, S2y, S2z), P3(S3x, S3y, S3z), . . . which are projected on the estimated plane P is minimum is calculated using a statistical method, and the point thus calculated is set as a temporary reference point OC. Since a specific method is the same as that described in the second embodiment, the description thereof is omitted.

Then, the temporary reference point OC is corrected and set as a reference point OR, and the coordinates ORx, ORy, and ORz thereof are respectively obtained as values corresponding to offsets Cx, Cy, and Cz. Since a specific method is the same as that described in the second embodiment, the description thereof is omitted.

Thus, even when an azimuth measuring device is placed to a mobile object such as a vehicle and the direction of the azimuth measuring device is changed while retaining its attitude with respect to a specific direction, offset information corresponding to one in the case where the direction of the azimuth measuring device change arbitrarily can be obtained.

In addition, when the azimuth measuring device is placed to a mobile object such as a vehicle and the mounting attitude thereof is almost retained, the coordinates of the temporary reference point OC may be set to as offsets Cx, Cy, and Cz as they are without obtaining the corrected reference point OR. The reason is that although a temporary reference point OC may include a large error in a normal direction of the specific plane P, this error does not influence the accuracy of the calculation of an azimuth angle.

Figure 15:
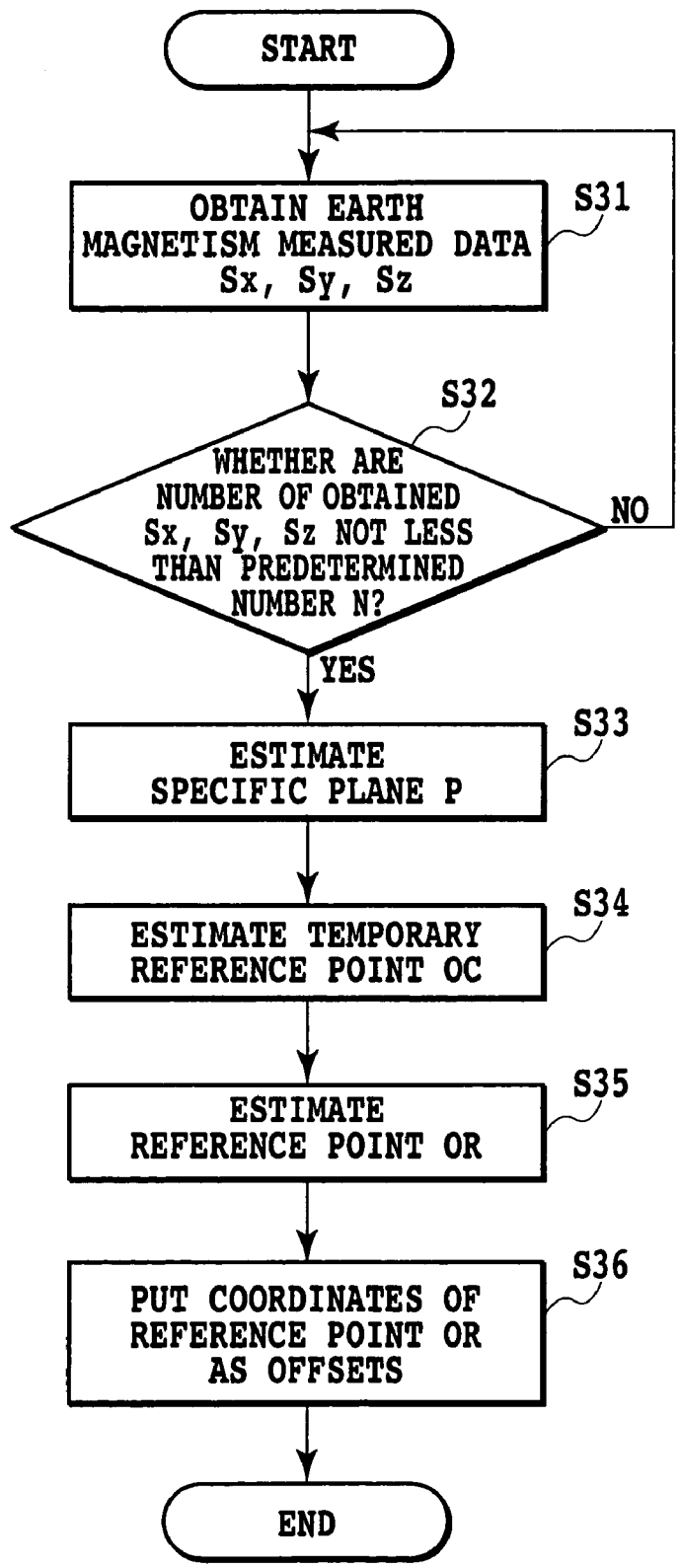
FIG. 15 is a flowchart showing a method for obtaining offset information in an embodiment of the present invention.

FIG. 15 is a flowchart showing a method for obtaining offset information in the third embodiment of the present invention.

In FIG. 15, the data buffer section 18 obtains geomagnetic measured data Sx, Sy, and Sz, and inputs them into a buffer. When it is considered that the obtained geomagnetic measured data Sx, Sy, and Sz are not adequate due to the mixing-in of noises and the like, the obtained geomagnetic measured data Sx, Sy, and Sz may not be inputted into the buffer. (Step S31)

Next, it is determined whether the number of geomagnetic measured data Sx, Sy, and Sz which have been retained in the data buffer 18 have reached a predetermined number N of data to be obtained. (Step S32)

When the number of geomagnetic measured data Sx, Sy, and Sz which have been retained in the data buffer 18 have not reached the predetermined number N of data to be obtained, the process returns to Step S31.

On the other hand, when the number of geomagnetic measured data Sx, Sy, and Sz which have been retained in the data buffer 18 have reached the predetermined number N of data to be obtained, the data processing section 19 reads, from the data buffer section 18, geomagnetic measured data Sx, Sy, and Sz to the number of which corresponds to the predetermined number N of data to be obtained, and a specific plane P is estimated in the vicinity of which the individual data P1(S1x, S1y, S1z), P2(S2x, S2y, S2z), P3(S3x, S3y, S3z), . . . which are read are distributed. Note that, after reading, from the data buffer section 18, the geomagnetic measured data Sx, Sy, and Sz to the number of which corresponds to the predetermined number N of data to be obtained, depending on the state, the oldest data among the geomagnetic measured data Sx, Sy, and Sz retained in the data buffer section 18 may be cleared, or the data to the number of which corresponds to the number of read data may be cleared. (Step S33)

Subsequently, P1(S1x, S1y, S1z), P2(S2x, S2y, S2z), P3(S3x,S3y,S3z), . . . are projected onto the estimated plane P, and the coordinates OCx, OCy, and OCz of a temporary reference point OC is estimated such that the variation ofdistancestoP1(S1x, S1y, S1z), P2(S2x, S2y, S2z), P3(S3x, S3y, S3z), . . . projected on the plane P is minimum. (Step 34)

Then, the coordinates OCx, OCy, and OCz of the temporary reference point OC are corrected and set as a reference point OR, and the coordinates ORx, ORy, and ORz thereof is calculated. (Step 35)

Then, the coordinates ORx, ORy, and ORz of the reference point OR are stored in the offset information storing section 20 as the offsets of the geomagnetic measured data Sx, Sy, and Sz. Note that, when it is considered that the coordinates ORx, ORy, and ORz of the estimated reference point OR are not adequate because of the mixing-in of noises, the presence of a surrounding magnetic field, and the like, the coordinates ORx, ORy, and ORz of the estimated reference point OR may not be stored in the offset information storing section 20, or the geomagnetic measured data Sx, Sy, and Sz retained in the data buffer section 18 may be cleared depending on the state. (Step 36)

Incidentally, when an azimuth measuring device is placed to a mobile object such as a vehicle and the mounting attitude thereof is almost retained, the coordinates of the temporary reference point OC may be set to as offsets as they are without obtaining the corrected reference point OR.

INDUSTRIAL APPLICABILITY

For an azimuth measuring device of an earth magnetism detecting method, when a magnetized component such as a speaker is placed around a magnetic field sensor, an offset occurs in an output of the magnetic field sensor because of the presence of a magnetic field leaking from the magnetized component. Accordingly, in order to prevent an error from occurring in the calculation of an azimuth angle due to offsets, it is necessary to carry out the calibrations of offsets.

The present invention is to provide an azimuth measuring device which is capable of simply obtaining, in various situations, offset information required for carrying out the calibrations.

The invention claimed is:

1. An azimuth measuring device comprising:
   triaxial earth magnetism detecting means for detecting earth magnetism;
   output data obtaining means for repeatedly obtaining triaxial output data not smaller than a predetermined number of times, the triaxial output data being obtained from the earth magnetism detecting means at a time when the direction of the earth magnetism detecting means changes in a three dimensional space;
   reference point estimating means for estimating, using a statistical method, coordinates of a position where variation of distances from a group of triaxial output data obtained by the output data obtaining means is minimum in a three dimensional space in which the triaxial output data are placed by relating the values of the triaxial output data to the direction components of the respective axes, and for setting the coordinates which are estimated to as a reference point;
   offset information calculating means for calculating offset information of output data from the earth magnetism detecting means based on coordinates of the reference point obtained by the reference point estimating means; and
   plane determining means for determining whether a group of output data obtained by the output data obtaining means are distributed in the vicinity of a specific plane,
   wherein when it is determined by the plane determining means that the group of output data are distributed in the vicinity of the specific plane, the coordinates of the reference point are not estimated by the reference point estimating means, or the coordinates of the reference point estimated by the reference point estimating means are deleted.

2. The azimuth measuring device according to claim 1, wherein the plane determining means makes the determination based on whether a matrix consisted of coefficients of a system of linear equations with the reference points being unknowns is singular or nearly singular.

3. The azimuth measuring device according to claim 1, wherein the plane determining means estimates the specific plane using a group of output data obtained by the output data obtaining means, calculates a correlation between the group of output data and the specific plane, and makes the determination based on whether the correlation is greater than a predetermined value.

4. The azimuth measuring device according to claim 1, wherein the plane determining means makes the determination based on whether a summation of distances is greater than a predetermined value, one of the distances being a distance to the specific plane from a point that is a farthermost point from the specific plane among the group of output data in one of two domains separated by the specific plane, and the other one of the distances being a distance to the specific plane from a point that is a farthermost point from the specific plane among the group of output data in the other one of the two domains.

5. The azimuth measuring device according to any one of claims 1 to 4 farther comprising warning notice displaying means for displaying a warning notice when the plane determining means determines that the group of output data distributes in the vicinity of the specific plane.

6. An azimuth measuring device comprising:
triaxial earth magnetism detecting means for detecting earth magnetism;
output data obtaining means for repeatedly obtaining triaxial output data not smaller than a predetermined number of times, the triaxial output data being obtained from the earth magnetism detecting means at a time when the direction of the earth magnetism detecting means changes in a three dimensional space;
reference point estimating means for estimating, using a statistical method, coordinates of a position where variation of distances from a group of triaxial output data obtained by the output data obtaining means is minimum in a three dimensional space in which the triaxial output data are placed by relating the values of the triaxial output data to the direction components of the respective axes, and for setting the coordinates which are estimated to as a reference point;
offset information calculating means for calculating offset information of output data from the earth magnetism detecting means based on coordinates of the reference point obtained by the reference point estimating means;
plane determining means for determining whether a group of triaxial output data obtained by the output data obtaining means are distributed in the vicinity of a specific plane;
plane estimating means for estimating the specific plane using a group of output data obtained by the output data obtaining means, and for setting the specific plane which is estimated as a reference plane;
temporary reference point estimating means for estimating, using a statistical method, coordinates of a position where variation of distances is minimum on the reference plane obtained by the plane estimating means, the distances being those from a group of projected points where a group of triaxial output data obtained by the output data obtaining means are projected on the reference plane, and for setting the coordinates which is estimated as a temporary reference point; and
reference point correcting means for correcting a temporary reference point obtained by the temporary reference point estimating means, and for setting the temporary reference point which is corrected as a reference point,
wherein when it is determined by the plane determining means that the group of output data are distributed in the vicinity of the specific plane, the reference plane is estimated by the plane determining means; a temporary reference point is estimated by the temporary reference point estimating means; a reference point is calculated by the reference point correcting means; and the offset information calculating means calculates offset information of output data of the earth magnetism detecting means based on coordinates of a reference point calculated by the reference point correcting means.

7. The azimuth measuring device according to claim 6, wherein the plane determining means makes the determination based on whether a matrix consisted of coefficients of a system of linear equations with the reference points being unknowns is singular or nearly singular.

8. The azimuth measuring device according to claim 6, wherein the plane determining means estimates the specific plane using a group of output data obtained by the output data obtaining means, calculates a correlation between the group of output data and the specific plane, and makes the determination based on whether the correlation is greater than a predetermined value.

9. The azimuth measuring device according to claim 6, wherein the plane determining means makes the determination based on whether a summation of distances is greater than a predetermined value, one of the distances being a distance to the specific plane from a point that is a farthermost point from the specific plane among the group of output data in one of two domains separated by the specific plane, and the other one of the distances being a distance to the specific plane from a point that is a farthermost point from the specific plane among the group of output data in the other one of the two domains.

10. The azimuth measuring device according to any one of claims 6 to 9 farther comprising warning notice displaying means for displaying a warning notice when the plane determining means determines that the group of output data distributes in the vicinity of the specific plane.

11. The azimuth measuring device according to any one of claims 6 to 9, wherein the reference point correcting means sets a closest point to a reference point previously estimated as the reference point on a straight line which passes through the temporary reference point, and which is perpendicular to the reference plane.

12. The azimuth measuring device according to any one of claims 6 to 9, wherein the reference point correcting means estimates a representative value of distances from the group of projected points to the temporary reference point using a statistical method, and sets, as the reference point, a point whose distance from a circle on the reference plane is equal to a predetermined value, the circle having the temporary reference point as the center and the representative value of the distances as the radius.

13. An azimuth measuring device comprising:
triaxial earth magnetism detecting means for detecting earth magnetism;
output data obtaining means for repeatedly obtaining triaxial output data not smaller than a predetermined number of times, the triaxial output data being obtained from the earth magnetism detecting means at a time when the direction of the earth magnetism detecting means changes in a three dimensional space;
plane estimating means for estimating a plane of which a group of triaxial output data obtained by the output data obtaining means locate in the vicinity, in a three dimensional space in which the triaxial output data are placed by relating the values of the triaxial output data to the direction components of the respective axes, and for setting the plane which is estimated as a reference plane;

temporary reference point estimating means for estimating, using a statistical method, coordinates of a position where variation of distances is minimum on the reference plane obtained by the plane estimating means, the distances being those from a group of projected points where a group of triaxial output data obtained by the output data obtaining means are projected on the reference plane, and for setting the coordinates which is estimated as a temporary reference point;

reference point correcting means for correcting a temporary reference point obtained by the temporary reference point estimating means, and for setting the temporary reference point which is corrected as a reference point; and offset information calculating means for calculating offset information of output data from the earth magnetism detecting means based on coordinates of the reference point obtained by the reference point correcting means.

14. The azimuth measuring device according to claim 13, wherein the reference point correcting means sets a closest point to a reference point previously estimated as the reference point on a straight line which passes through the temporary reference point, and which is perpendicular to the reference plane.

15. The azimuth measuring device according to claim 13, wherein the reference point correcting means estimates a representative value of distances from the group of projected points to the temporary reference point using a statistical method, and sets, as the reference point, a point whose distance from a circle on the reference plane is equal to a predetermined value, the circle having the temporary reference point as the center and the representative value of the distances as the radius.

* * * * *